US012743463B1

(12) United States Patent
Day et al.

(10) Patent No.: US 12,743,463 B1
(45) Date of Patent: Sep. 22, 2026

(54) TWO-STAGE CAMERA-BASED VIDEO SEARCH USING A COMBINATION OF DRAFT MODEL AND FULL VISION LANGUAGE MODEL (VLM)

(71) Applicant: Ambarella International LP, Santa Clara, CA (US)

(72) Inventors: Christopher Neil Day, Los Gatos, CA (US); Malhar Palkar, Cupertino, CA (US)

(73) Assignee: Ambarella International LP, Santa Clara, CA (US)

(*) Notice: Subject to any disclaimer, the term of this patent is extended or adjusted under 35 U.S.C. 154(b) by 0 days.

(21) Appl. No.: 18/759,112

(22) Filed: Jun. 28, 2024

(51) Int. Cl.
*G06F 16/583* (2019.01)
*H04N 21/84* (2011.01)

(52) U.S. Cl.
CPC ........... *G06F 16/583* (2019.01); *H04N 21/84* (2013.01)

(58) Field of Classification Search
None
See application file for complete search history.

(56) References Cited

U.S. PATENT DOCUMENTS 11,651,456 B1 * 5/2023 Day ....................... G06V 20/40 705/314
11,954,151 B1 * 4/2024 Jain ....................... G06F 16/783
2018/0221769 A1 * 8/2018 Kosai ..................... H04L 67/125
2021/0174163 A1 * 6/2021 Verma .................. G06V 10/765
2024/0137601 A1 * 4/2024 Matusek .......... H04N 21/23418
2024/0146524 A1 * 5/2024 Xu .......................... H04L 9/088
2025/0007790 A1 * 1/2025 Marwah .................. H04L 41/16
2025/0068674 A1 * 2/2025 Rozner .................. G06V 10/82
2025/0078484 A1 * 3/2025 Nguyen .................. G10L 15/30
2025/0119625 A1 * 4/2025 Bhattacharyya ........ G06F 40/30

* cited by examiner

*Primary Examiner* — Giuseppi Giuliani
(74) *Attorney, Agent, or Firm* — Maiorana Patent Law, PA

(57) ABSTRACT

An apparatus comprising an interface and a processor. The interface may receive pixel data and a user input. The processor may upload encoded video to a remote device, implement a first AI, and upload image match data to the remote device in response to the user input and video frames. The first AI may parse a natural text description of the user input to determine search parameters and search the video frames for a match between the search parameters and video data of the video frames. The remote device may store the encoded video, implement a second AI and generate decoded video in response to the encoded video and the image match data. The second AI may implement a full AI model and the first AI may implement a draft model version of the full AI model. The second AI may generate a plain language description of the decoded video.

20 Claims, 12 Drawing Sheets

TWO-STAGE CAMERA-BASED VIDEO SEARCH USING A COMBINATION OF DRAFT MODEL AND FULL VISION LANGUAGE MODEL (VLM)

FIELD OF THE INVENTION

The invention relates to video analysis generally and, more particularly, to a method and/or apparatus for implementing a two-stage camera-based video search using a combination of draft model and full vision language model (VLM).

BACKGROUND

Searching images can be very useful. Police procedurals on TV and in movies regularly include a scene where multiple detectives are involved in a time consuming process of manually watching security footage in an attempt to find evidence. Computer vision is useful for detecting particular types of objects and features. However, the objects and features are classified as particular types of objects with limited details provided resulting in a difficult user experience. Searching video using computer vision is computationally expensive.

Multi-modal large language models can be employed in security cameras to quickly search for images in a video stream. The user can input an image to search for using a text description. Using large language models has an advantage of not having to be trained by the camera maker for every possible image in advance. However, the hardware implemented in security cameras is limited by size, cost, and available power. For example, a system-on-chip (SoC) implemented by consumer security cameras has limited artificial intelligence (AI) processing capability and limited memory storage. The hardware limitations prevent the use of a full Vision Language Model (VLM) on the edge device.

Connecting to cloud computing services can provide low-powered edge devices with access to large amounts of memory and processing capabilities. A full VLM could run in the cloud. However, continuously running a VLM in the cloud is expensive and consumes a lot of power. Data centers are already estimated to consume approximately 1.5% of global energy use. The energy consumption by AI could increase energy-consumption ten-fold. An on-premise device/server dedicated to AI processing VLM might not have sufficient performance to continuously run a VLM on every video feed simultaneously in scenarios with multiple cameras connected. It would be desirable to implement a two-stage camera-based video search using a combination of draft model and full vision language model (VLM).

SUMMARY

The invention concerns an apparatus comprising an interface and a processor. The interface may be configured to receive pixel data of an environment and a user input comprising a natural text description. The processor may be configured to process the pixel data arranged as video frames, upload encoded video frames to a remote computing device in response to encoding operations performed on the video frames, implement a first AI module, and upload image match data to the remote computing device in response to the user input and the video frames. The first AI module may be configured to parse the natural text description of the user input to determine search parameters and search the video frames for a match between the search parameters and video data of the video frames. The remote computing device may be configured to store the encoded video frames, implement a second AI module and generate a decoded video sequence in response to the encoded video frames and the image match data. The second AI module may implement a full AI model and the first AI module may implement a draft model version of the full AI model. The second AI module may be configured to generate a plain language description of the decoded video sequence.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
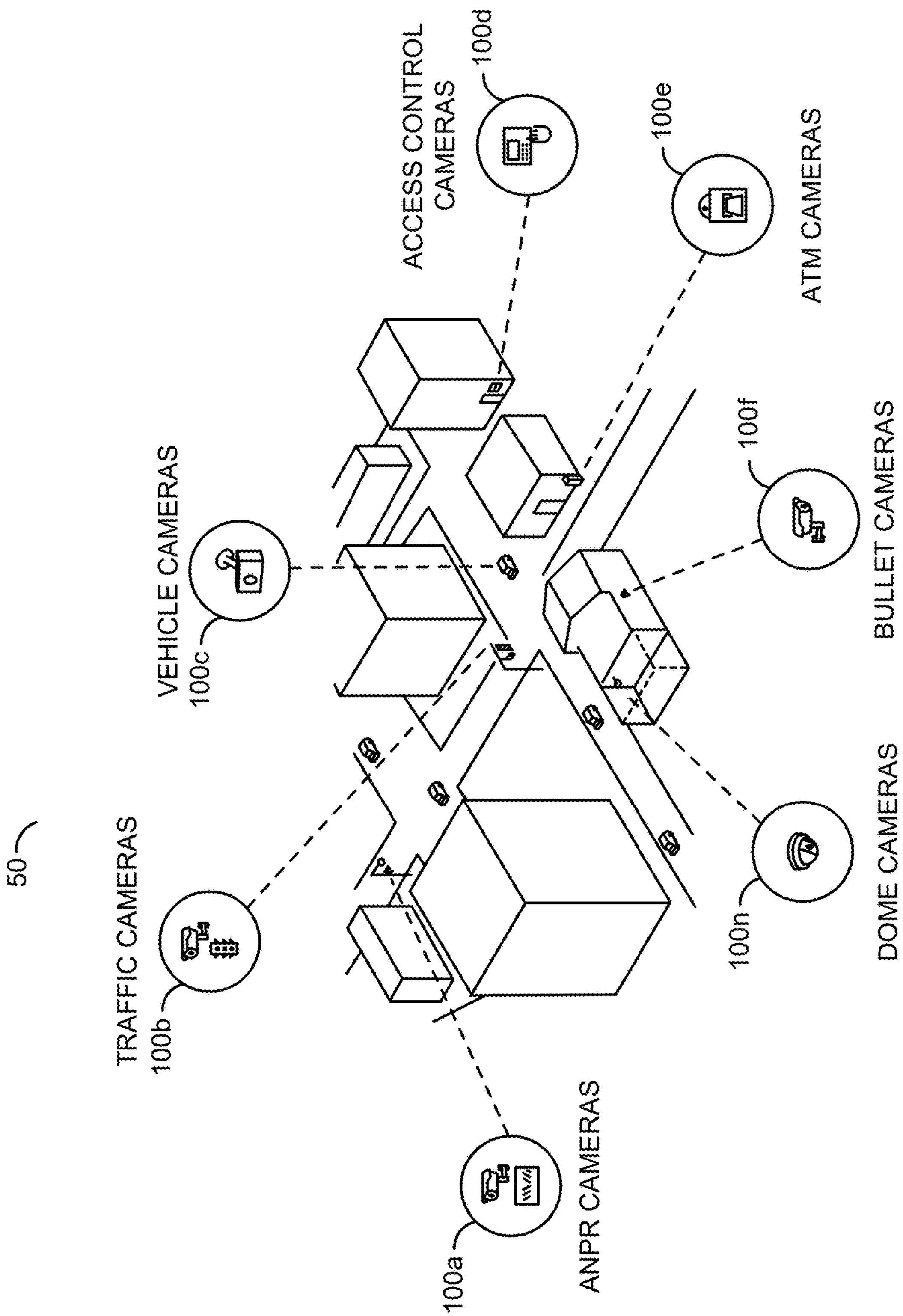
FIG. 1 is a diagram illustrating examples of internet protocol cameras that may implement a two-stage camera-based video search using a combination of draft model and full vision language model (VLM) models in accordance with example embodiments of the invention.

Embodiments of the present invention include providing a two-stage camera-based video search using a combination of draft model and full vision language model (VLM) that may (i) implement a draft artificial intelligence model locally on edge devices, (ii) implement a VLM at a device separate from edge devices, (iii) enable a plain language video search for an end-user, (iv) find a similarity between a text prompt and an image in real-time video analysis, (v) match an image from a search to encoded video frames stored separate from edge devices, (vi) extract and decode a sequence of video frames from a stored encoded video frames, (vii) generate detailed information about the extracted sequence of video frames using a VLM, (viii) operate a VLM at a framerate greater than the video framerate, (ix) enable joint training of the draft model and the VLM, (x) prevent excessive power consumption by a VLM, and/or (xi) be implemented as one or more integrated circuits.

Embodiments of the present invention may be configured to implement two artificial intelligence (AI) neural network models on at least two separate devices. A smaller AI model (e.g., a draft model network) may be implemented on one or more edge devices. For example, the edge devices may comprise video cameras (e.g., security cameras, doorbell cameras, vehicle cameras, etc.). A larger AI model (e.g., a full vision language model (VLM)) may be implemented on a device implemented remotely from the edge devices. For example, the device implemented remotely from the edge devices (e.g., a remote computing device) may be an on-premise dedicated computing device (e.g., an AI-box and/or AI server) and/or a cloud computing service. Implementing two separate AI models on different devices may enable computations and/or analysis to be split between multiple devices. AI operations performed by the draft AI model may be suited to the functions performed by the edge devices and the AI operations performed by the VLM may be suited to the capabilities of the remote computing device.

The draft AI model may implement a frame-based analysis of video frames (e.g., images) performed by a system-on-chip (SoC) implemented locally on the edge device. In one example, the draft AI model may be a Contrastive Language-Image Pre-training (CLIP) neural network AI model. The CLIP draft model may provide a frame-based analysis. The draft model may be configured to perform the AI operations within the constraints of the hardware capabilities of the edge devices (e.g., the SoC implemented by the edge devices and the associated memory). For example, the hardware capabilities of the edge devices may be generally limited compared to the hardware capabilities of the remote computing device. In one example, the draft AI model may perform the AI operations using less computational performance and/or less memory than the full VLM. The particular hardware configuration implemented by the edge devices may be varied according to the design criteria of a particular implementation.

The draft AI neural network model may be configured to perform a search of the video frames in real-time. The draft AI model may be configured to find a similarity between a text prompt and image. The text prompt may be a user input. The text prompt provided by the user input may comprise natural language input (e.g., plain text input). For example, the draft AI model may be implemented to provide a video question-answer (VQA) configuration. In one example, the draft AI model may be zero shot model that implements a prompt that may be tuned for a particular environment and/or scenario without additional (e.g., environment-specific) training.

The draft AI model may be configured to detect one or more video frames that comprise imagery described in the user input text prompt. In response to detecting an image (e.g., a video frame) that comprises the user input search prompt, the draft AI model may generate image match data. For example, the image match number may comprise a frame number and/or timestamp information of the matching video frame. The edge device may be configured to send the image match data to the remote computing device.

The edge device may be configured to perform video processing operations. For example, the video processing operations may be configured to encode video frames generated in response to pixel data captured by an image sensor. The processor implemented by the edge device may be configured to process the pixel data arranged as video frames. In one example, the video processing operations may comprise H.264 encoding. In another example, the video processing operations may comprise H.265 encoding. In yet another example, the video processing operations may comprise AV1 encoding. The type of video encoding performed may be varied according to the design criteria of a particular implementation.

The edge devices may be configured to transmit the encoded video frames to the remote computing device. For example, the remote computing device may comprise mass storage configured to store large volumes of data (e.g., multiple terabytes of data). The remote computing device may be configured to store encoded video data generated by multiple different edge devices. In one example, multiple security cameras implemented at a single property may each provide separate encoded video streams to the remote computing device. In another example, video streams generated by security cameras implemented at multiple properties may be stored by the remote computing device. The encoded video streams and/or the image match data may be communicated by each of the edge devices to the remote computing device.

The remote computing device may be configured to retrieve a video sequence from the encoded video frames based on the image match data. The remote computing device may be configured to decode the video frames that correspond to the video sequence. The decoded video sequence may comprise video frames captured earlier than the matched video frame and/or video frames captured after the matched video frame. The video frames in the decoded video sequence captured before and/or after the video frame that corresponds to the image match data may provide additional context for the search results. The full VLM may be configured to operate on the decoded video sequence.

The VLM may be configured to provide more details about the decoded video sequence than the draft AI model may be capable of providing based on one image. The VLM may generate details about the decoded video sequence rather than a single image. The VLM may be capable of generating a larger granularity of description than the draft AI model because the VLM may be trained on a larger data set and the remote computing device comprises more memory than the edge devices. The VLM may be configured to operate at a full frame rate (or greater) than the decoded video sequence. For example, the draft AI model may be limited to performing AI operations at the frame rate of the image sensor. The VLM may not be limited to performing the AI operations in real-time.

The AI operations performed for the VLM by the remote computing device may involve significant processing resources. Performing the AI operations for the VLM may consume a significant amount of power. By running the draft model on the edge device(s) first, and using the image match data to select a video sequence that may be a subset of the entire encoded video data, a CPU/GPU of the remote computing device may perform the AI operations when initiated (e.g., on demand). For example, the AI operations for the VLM may be initiated in response to the image match data (e.g., there may be no benefit to having the CPU/GPU of the remote computing device continuously run the AI operations for the VLM on each camera feed simultaneously).

The VLM may be configured to generate output data in response to the AI operations. The output data may comprise video data and/or a description of the video data. The video data may comprise the video frames from the decoded video sequence. For example, the remote computing device may present the encoded video frames that correspond to the decoded video sequence to the end user. In another example, the video data may comprise the image that matched the search prompt (e.g., the video frame from the image match data). The description of the video data may comprise a natural text description of the video data in the decoded video sequence. The natural text description of the video data may comprise information about the visual features in the video data as if described by a person. The natural text description of the video data may comprise behavior information about objects in the video data. For example, the natural text description of the video data may comprise data that may be suitable for a screen reader (e.g., to describe the video data to the visually impaired). The level of detail provided by the natural text description of the video data may be varied according to the design criteria of a particular implementation.

The draft AI model and the VLM may be trained jointly. For example, the scenarios may be jointly trained. The draft AI model may implement contrastive learning by computing a similarity between text and image pairs. For example, CLIP models may be trained on a large dataset. Large vision models may use CLIP for the image encoder and projections may be trained. A combination of CLIP and projection may be used as the draft AI model. Since the preprocessing may be the same for the draft AI model and the full VLM, there may be a correlation between the draft AI model and the prompts executed on the edge devices.

Referring to FIG. 1, a diagram illustrating examples of internet protocol cameras that may implement a two-stage camera-based video search using a combination of draft model and full vision language model (VLM) models in accordance with example embodiments of the invention is shown. An overhead view of an area 50 is shown. In the example shown, the area 50 may be an outdoor location. Streets, vehicles and buildings are shown.

Devices 100*a*-100*n* are shown at various locations in the area 50. The devices 100*a*-100*n* may each implement an edge device. The edge devices 100*a*-100*n* may comprise smart IP cameras (e.g., camera systems). The edge devices 100*a*-100*n* may comprise low power technology designed to be deployed in embedded platforms at the edge of a network (e.g., microprocessors running on sensors, cameras, or other battery-powered devices), where power consumption is a critical concern. In an example, the edge devices 100*a*-100*n* may comprise various traffic cameras and intelligent transportation systems (ITS) solutions.

The edge devices 100*a*-100*n* may be implemented for various applications. In the example shown, the edge devices 100*a*-100*n* may comprise automated number plate recognition (ANPR) cameras 100*a*, traffic cameras 100*b*, vehicle cameras 100*c*, access control cameras 100*d*, automatic teller machine (ATM) cameras 100*e*, bullet cameras 100*f*, dome cameras 100*n*, etc. In an example, the edge devices 100*a*-100*n* may be implemented as traffic cameras and intelligent transportation systems (ITS) solutions designed to enhance roadway security with a combination of person and vehicle detection, vehicle make/model recognition, and automatic number plate recognition (ANPR) capabilities.

In the example shown, the area 50 may be an outdoor location. In some embodiments, the edge devices 100*a*-100*n* may be implemented at various indoor locations. In an example, edge devices 100*a*-100*n* may incorporate a convolutional neural network in order to be utilized in security (surveillance) applications and/or access control applications. In an example, the edge devices 100*a*-100*n* implemented as security camera and access control applications may comprise battery-powered cameras, doorbell cameras, outdoor cameras, indoor cameras, etc. The security camera and access control applications may realize performance benefits from application of a convolutional neural network in accordance with embodiments of the invention. In an example, an edge device utilizing a convolutional neural network in accordance with an embodiment of the invention may take massive amounts of image data and make on-device inferences to obtain useful information (e.g., multiple time instances of images per network execution) with reduced bandwidth and/or reduced power consumption. In another example, security (surveillance) applications and/or location monitoring applications (e.g., trail cameras) may benefit from a large amount of optical zoom. The design, type and/or application performed by the edge devices 100*a*-100*n* may be varied according to the design criteria of a particular implementation.

Figure 2:
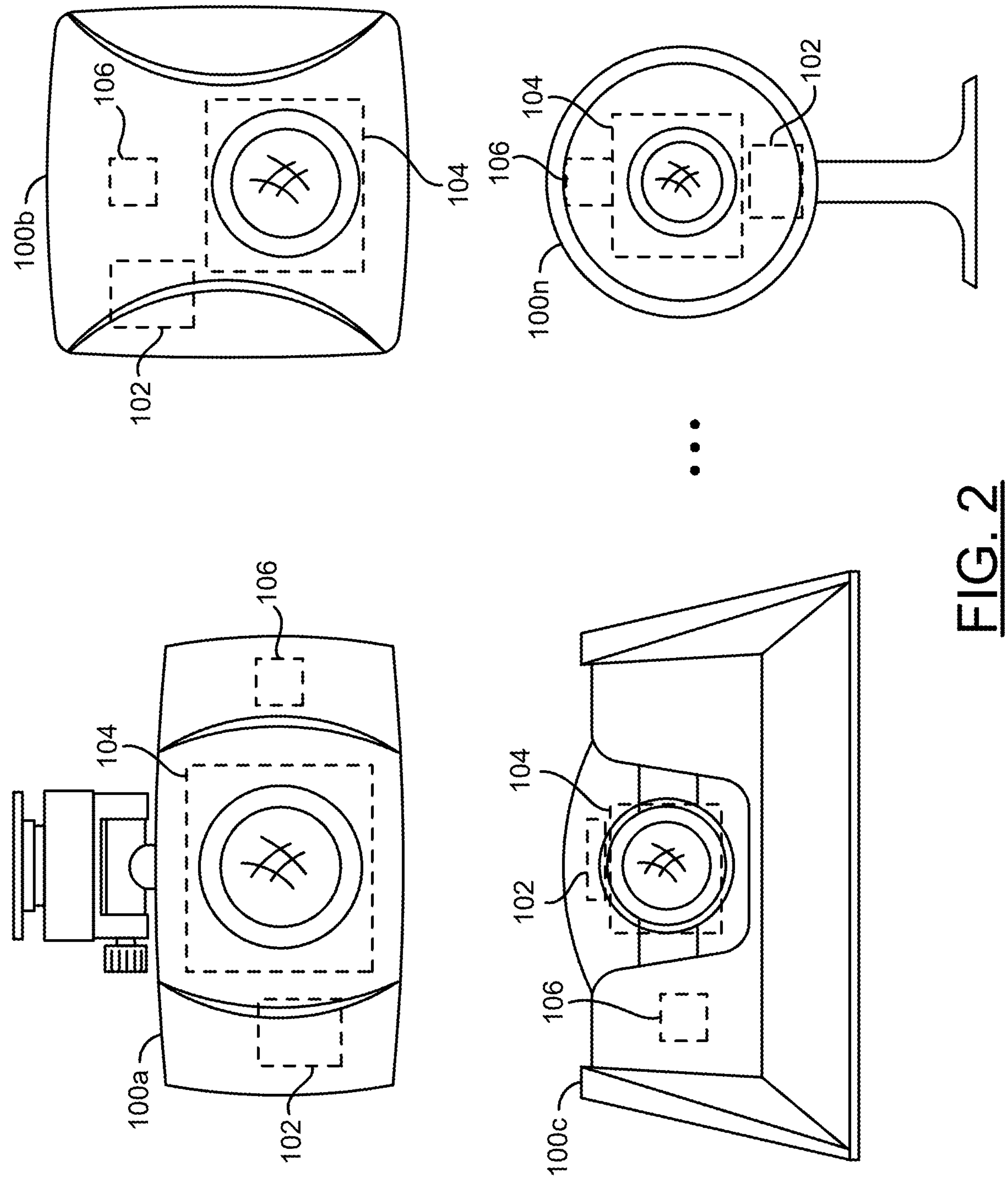
FIG. 2 is a diagram illustrating example edge device cameras implementing a draft model.

Referring to FIG. 2, a diagram illustrating example edge device cameras implementing a draft model is shown. The camera systems 100*a*-100*n* are shown. Each camera device 100*a*-100*n* may have a different style and/or use case. For example, the camera 100*a* may be an action camera, the camera 100*b* may be a ceiling mounted security camera, the camera 100*n* may be a webcam, etc. Other types of cameras may be implemented (e.g., home security cameras, battery powered cameras, doorbell cameras, stereo cameras, etc.). In some embodiments, the camera systems 100*a*-100*n* may be stationary cameras (e.g., installed and/or mounted at a single location). In some embodiments, the camera systems 100*a*-100*n* may be handheld cameras. In some embodiments, the camera systems 100*a*-100*n* may be configured to pan across an area, may be attached to a mount, a gimbal, a camera rig, etc. The design/style of the cameras 100*a*-100*n* may be varied according to the design criteria of a particular implementation.

Each of the camera systems 100*a*-100*n* may comprise a block (or circuit) 102, a block (or circuit) 104 and/or a block (or circuit) 106. The circuit 102 may implement a processor. The circuit 104 may implement a capture device. The circuit 106 may implement an inertial measurement unit (IMU). The camera systems 100*a*-100*n* may comprise other components (not shown). Details of the components of the cameras 100*a*-100*n* may be described in association with FIG. 3.

The processor 102 may be configured to implement an artificial neural network (ANN). In an example, the ANN may comprise a convolutional neural network (CNN). The processor 102 may be configured to implement a video encoder. The processor 102 may be configured to process the pixel data arranged as video frames. The capture device 104 may be configured to capture pixel data that may be used by the processor 102 to generate video frames. The IMU 106 may be configured to generate movement data (e.g., vibration information, an amount of camera shake, panning direction, etc.). In some embodiments, a structured light projector may be implemented for projecting a speckle pattern onto the environment. The capture device 104 may capture the pixel data comprising a background image (e.g., the environment) with the speckle pattern. While each of the cameras 100*a*-100*n* are shown without implementing a structured light projector, some of the cameras 100*a*-100*n* may be implemented with a structured light projector (e.g., cameras that implement a sensor that capture IR light).

The cameras 100*a*-100*n* may be edge devices. The processor 102 implemented by each of the cameras 100*a*-100*n* may enable the cameras 100*a*-100*n* to implement various functionality internally (e.g., at a local level). For example, the processor 102 may be configured to perform object/event detection (e.g., computer vision operations), 3D reconstruction, liveness detection, depth map generation, video encoding, electronic image stabilization and/or video transcoding on-device). For example, even advanced processes such as computer vision and 3D reconstruction may be performed by the processor 102 without uploading video data to a cloud service in order to offload computation-heavy functions (e.g., computer vision, video encoding, video transcoding, etc.).

In some embodiments, multiple camera systems may be implemented (e.g., camera systems 100*a*-100*n* may operate independently from each other). For example, each of the cameras 100*a*-100*n* may individually analyze the pixel data captured and perform the event/object detection locally. In some embodiments, the cameras 100*a*-100*n* may be configured as a network of cameras (e.g., security cameras that send video data to a central source such as network-attached storage and/or a cloud service). The locations and/or configurations of the cameras 100*a*-100*n* may be varied according to the design criteria of a particular implementation.

The capture device 104 of each of the camera systems 100*a*-100*n* may comprise a single lens (e.g., a monocular camera). The processor 102 may be configured to accelerate preprocessing of the speckle structured light for monocular 3D reconstruction. Monocular 3D reconstruction may be performed to generate depth images and/or disparity images without the use of stereo cameras.

Figure 3:
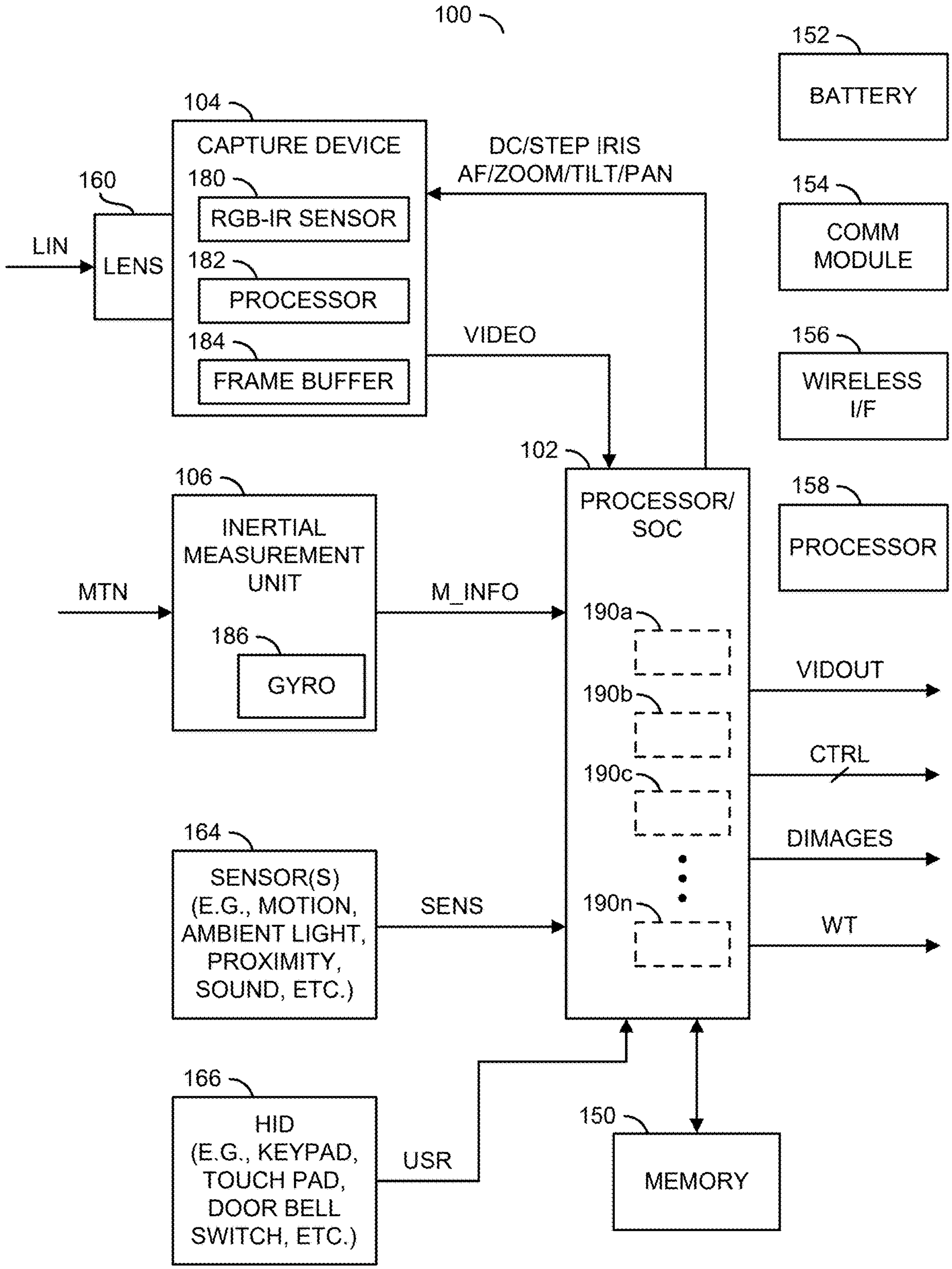
FIG. 3 is a block diagram illustrating a camera system.

Referring to FIG. 3, a block diagram illustrating a camera system is shown. The camera system (or apparatus) 100 may be a representative example of the cameras 100*a*-100*n* shown in association with FIG. 2. The camera system 100 may comprise the processor/SoC 102, the capture device 104, and the IMU 106.

The camera system 100 may further comprise a block (or circuit) 150, a block (or circuit) 152, a block (or circuit) 154, a block (or circuit) 156, a block (or circuit) 158, a block (or circuit) 160, a block (or circuit) 164, and/or a block (or circuit) 166. The circuit 150 may implement a memory. The circuit 152 may implement a battery. The circuit 154 may implement a communication device. The circuit 156 may implement a wireless interface. The circuit 158 may implement a general purpose processor. The block 160 may implement an optical lens. The circuit 164 may implement one or more sensors. The circuit 166 may implement a human interface device (HID). In some embodiments, the camera system 100 may comprise the processor/SoC 102, the capture device 104, the IMU 106, the memory 150, the lens 160, the sensors 164, the battery 152, the communication module 154, the wireless interface 156 and the processor 158. In another example, the camera system 100 may comprise processor/SoC 102, the capture device 104, the IMU 106, the processor 158, the lens 160, and the sensors 164 as one device, and the memory 150, the battery 152, the communication module 154, and the wireless interface 156 may be components of a separate device. The camera system 100 may comprise other components (not shown). The number, type and/or arrangement of the components of the camera system 100 may be varied according to the design criteria of a particular implementation.

In some embodiments, the processor 102 may be implemented as a video processor. In an example, the processor 102 may be configured to receive triple-sensor video input with high-speed SLVS/MIPI-CSI/LVCMOS interfaces. In some embodiments, the processor 102 may be configured to perform depth sensing in addition to generating video frames. In an example, the depth sensing may be performed in response to depth information and/or vector light data captured in the video frames. In some embodiments, the processor 102 may be implemented as a dataflow vector processor. In an example, the processor 102 may comprise a highly parallel architecture configured to perform image/video processing and/or radar signal processing.

The memory 150 may store data. The memory 150 may implement various types of memory including, but not limited to, a cache, flash memory, memory card, random access memory (RAM), dynamic RAM (DRAM), etc. The type and/or size of the memory 150 may be varied according to the design criteria of a particular implementation. The data stored in the memory 150 may correspond to a video file, motion information (e.g., readings from the sensors 164), video fusion parameters, image stabilization parameters, user inputs, computer vision models, feature sets, radar data cubes, radar detections and/or metadata information. In some embodiments, the memory 150 may store reference images. The reference images may be used for computer vision operations, 3D reconstruction, auto-exposure, etc. In some embodiments, the reference images may comprise reference structured light images.

The processor/SoC 102 may be configured to execute computer readable code and/or process information. In various embodiments, the computer readable code may be stored within the processor/SoC 102 (e.g., microcode, etc.) and/or in the memory 150. In an example, the processor/SoC 102 may be configured to execute one or more artificial neural network models (e.g., facial recognition CNN, object detection CNN, object classification CNN, 3D reconstruction CNN, liveness detection CNN, etc.) stored in the memory 150. In an example, the memory 150 may store one or more directed acyclic graphs (DAGs) and one or more sets of weights and biases defining the one or more artificial neural network models. In yet another example, the memory 150 may store instructions to perform transformational operations (e.g., Discrete Cosine Transform, Discrete Fourier Transform, Fast Fourier Transform, etc.). The processor/SoC 102 may be configured to receive input from and/or present output to the memory 150. The processor/SoC 102 may be configured to present and/or receive other signals (not shown). The number and/or types of inputs and/or outputs of the processor/SoC 102 may be varied according to the design criteria of a particular implementation. The processor/SoC 102 may be configured for low power (e.g., battery) operation.

The battery 152 may be configured to store and/or supply power for the components of the camera system 100. The dynamic driver mechanism for a rolling shutter sensor may be configured to conserve power consumption. Reducing the power consumption may enable the camera system 100 to operate using the battery 152 for extended periods of time without recharging. The battery 152 may be rechargeable. The battery 152 may be built-in (e.g., non-replaceable) or replaceable. The battery 152 may have an input for connection to an external power source (e.g., for charging). In some embodiments, the apparatus 100 may be powered by an external power supply (e.g., the battery 152 may not be implemented or may be implemented as a back-up power supply). The battery 152 may be implemented using various battery technologies and/or chemistries. The type of the battery 152 implemented may be varied according to the design criteria of a particular implementation.

The communications module 154 may be configured to implement one or more communications protocols. For example, the communications module 154 and the wireless interface 156 may be configured to implement one or more of, IEEE 102.11, IEEE 102.15, IEEE 102.15.1, IEEE 102.15.2, IEEE 102.15.3, IEEE 102.15.4, IEEE 102.15.5, IEEE 102.20, Bluetooth®, and/or ZigBee®. In some embodiments, the communication module 154 may be a hard-wired data port (e.g., a USB port, a mini-USB port, a USB-C connector, HDMI port, an Ethernet port, a DisplayPort interface, a Lightning port, etc.). In some embodiments, the wireless interface 156 may also implement one or more protocols (e.g., GSM, CDMA, GPRS, UMTS, CDMA2000, 3GPP LTE, 4G/HSPA/WiMAX, SMS, etc.) associated with cellular communication networks. In embodiments where the camera system 100 is implemented as a wireless camera, the protocol implemented by the communications module 154 and wireless interface 156 may be a wireless communications protocol. The type of communications protocols implemented by the communications module 154 may be varied according to the design criteria of a particular implementation.

The communications module 154 and/or the wireless interface 156 may be configured to generate a broadcast signal as an output from the camera system 100. The broadcast signal may send video data, disparity data and/or a control signal(s) to external devices. For example, the broadcast signal may be sent to a cloud storage service (e.g., a storage service capable of scaling on demand). In some embodiments, the communications module 154 may not transmit data until the processor/SoC 102 has performed video analytics and/or radar signal processing to determine that an object is in the field of view of the camera system 100.

In some embodiments, the communications module 154 may be configured to generate a manual control signal. The manual control signal may be generated in response to a signal from a user received by the communications module 154. The manual control signal may be configured to activate the processor/SoC 102. The processor/SoC 102 may be activated in response to the manual control signal regardless of the power state of the camera system 100.

In some embodiments, the communications module 154 and/or the wireless interface 156 may be configured to receive a feature set. The feature set received may be used to detect events and/or objects. For example, the feature set may be used to perform the computer vision operations. The feature set information may comprise instructions for the processor 102 for determining which types of objects correspond to an object and/or event of interest.

In some embodiments, the communications module 154 and/or the wireless interface 156 may be configured to receive user input. The user input may enable a user to adjust operating parameters for various features implemented by the processor 102. In some embodiments, the communications module 154 and/or the wireless interface 156 may be configured to interface (e.g., using an application programming interface (API) with an application (e.g., an app). For example, the app may be implemented on a smartphone to enable an end user to adjust various settings and/or parameters for the various features implemented by the processor 102 (e.g., set video resolution, select frame rate, select output format, set tolerance parameters for 3D reconstruction, etc.).

The processor 158 may be implemented using a general purpose processor circuit. The processor 158 may be operational to interact with the video processing circuit 102 and the memory 150 to perform various processing tasks. The processor 158 may be configured to execute computer readable instructions. In one example, the computer readable instructions may be stored by the memory 150. In some embodiments, the computer readable instructions may comprise controller operations. Generally, input from the sensors 164 and/or the human interface device 166 are shown being received by the processor 102. In some embodiments, the general purpose processor 158 may be configured to receive and/or analyze data from the sensors 164 and/or the HID 166 and make decisions in response to the input. In some embodiments, the processor 158 may send data to and/or receive data from other components of the camera system 100 (e.g., the battery 152, the communication module 154 and/or the wireless interface 156). In some embodiments, the processor 158 may implement an integrated digital signal processor (IDSP). For example, the IDSP 158 may be configured to implement a warp engine. Which of the functionality of the camera system 100 is performed by the processor 102 and the general purpose processor 158 may be varied according to the design criteria of a particular implementation.

The lens 160 may be attached to the capture device 104. The capture device 104 may be configured to receive an input signal (e.g., LIN) via the lens 160. The signal LIN may be a light input (e.g., an analog image). The lens 160 may be implemented as an optical lens. The lens 160 may provide a zooming feature and/or a focusing feature. The capture device 104 and/or the lens 160 may be implemented, in one example, as a single lens assembly. In another example, the lens 160 may be a separate implementation from the capture device 104.

The capture device 104 may be configured to convert the input light LIN into computer readable data. The capture device 104 may capture data received through the lens 160 to generate raw pixel data. In some embodiments, the capture device 104 may capture data received through the lens 160 to generate bitstreams (e.g., generate video frames). For example, the capture devices 104 may receive focused light from the lens 160. The lens 160 may be directed, tilted, panned, zoomed and/or rotated to provide a targeted view from the camera system 100 (e.g., a view for a video frame, a view for a panoramic video frame captured using multiple camera systems 100*a*-100*n*, a target image and reference image view for stereo vision, etc.). The capture device 104 may generate a signal (e.g., VIDEO). The signal VIDEO may be pixel data (e.g., a sequence of pixels that may be used to generate video frames). In some embodiments, the signal VIDEO may be video data (e.g., a sequence of video frames). The signal VIDEO may be presented to one of the inputs of the processor 102. In some embodiments, the pixel data generated by the capture device 104 may be uncompressed and/or raw data generated in response to the focused light from the lens 160. In some embodiments, the output of the capture device 104 may be digital video signals.

In an example, the capture device 104 may comprise a block (or circuit) 180, a block (or circuit) 182, and a block (or circuit) 184. The circuit 180 may be an image sensor. The circuit 182 may be a processor and/or logic. The circuit 184 may be a memory circuit (e.g., a frame buffer). The lens 160 (e.g., camera lens) may be directed to provide a view of an environment surrounding the camera system 100. The lens 160 may be aimed to capture environmental data (e.g., the light input LIN). The lens 160 may be a wide-angle lens and/or fish-eye lens (e.g., lenses capable of capturing a wide field of view). The lens 160 may be configured to capture and/or focus the light for the capture device 104. Generally, the image sensor 180 is located behind the lens 160. Based on the captured light from the lens 160, the capture device 104 may generate a bitstream and/or video data (e.g., the signal VIDEO).

The capture device 104 may be configured to capture video image data (e.g., light collected and focused by the lens 160). The capture device 104 may capture data received through the lens 160 to generate a video bitstream (e.g., pixel data for a sequence of video frames). In various embodiments, the lens 160 may be implemented as a fixed focus lens. A fixed focus lens generally facilitates smaller size and low power. In an example, a fixed focus lens may be used in battery powered, doorbell, and other low power camera applications. In some embodiments, the lens 160 may be directed, tilted, panned, zoomed and/or rotated to capture the environment surrounding the camera system 100 (e.g., capture data from the field of view). In an example, professional camera models may be implemented with an active lens system for enhanced functionality, remote control, etc.

The capture device 104 may transform the received light into a digital data stream. In some embodiments, the capture device 104 may perform an analog to digital conversion. For example, the image sensor 180 may perform a photoelectric conversion of the light received by the lens 160. The processor/logic 182 may transform the digital data stream into a video data stream (or bitstream), a video file, and/or a number of video frames. In an example, the capture device 104 may present the video data as a digital video signal (e.g., VIDEO). The digital video signal may comprise the video frames (e.g., sequential digital images and/or audio). In some embodiments, the capture device 104 may comprise a microphone for capturing audio. In some embodiments, the microphone may be implemented as a separate component (e.g., one of the sensors 164).

The video data captured by the capture device 104 may be represented as a signal/bitstream/data VIDEO (e.g., a digital video signal). The capture device 104 may present the signal VIDEO to the processor/SoC 102. The signal VIDEO may represent the video frames/video data. The signal VIDEO may be a video stream captured by the capture device 104. In some embodiments, the signal VIDEO may comprise pixel data that may be operated on by the processor 102 (e.g., a video processing pipeline, an image signal processor (ISP), etc.). The processor 102 may generate the video frames in response to the pixel data in the signal VIDEO.

The signal VIDEO may comprise pixel data arranged as video frames. In some embodiments, the signal VIDEO may be images comprising a background (e.g., objects and/or the environment captured) and the speckle pattern generated by a structured light projector. The signal VIDEO may comprise single-channel source images. The single-channel source images may be generated in response to capturing the pixel data using the monocular lens 160.

The image sensor 180 may receive the input light LIN from the lens 160 and transform the light LIN into digital data (e.g., the bitstream). For example, the image sensor 180 may perform a photoelectric conversion of the light from the lens 160. In some embodiments, the image sensor 180 may have extra margins that are not used as part of the image output. In some embodiments, the image sensor 180 may not have extra margins. In various embodiments, the image sensor 180 may be implemented as an RGB sensor, an RGB-IR sensor, an RCCB sensor, a monocular image sensor, stereo image sensors, a thermal sensor, an event-based sensor, etc. For example, the image sensor 180 may be any type of sensor configured to provide sufficient output for computer vision operations to be performed on the output data (e.g., neural network-based detection). In the context of the embodiment shown, the image sensor 180 may be configured to generate an RGB-IR video signal. In an infrared light only illuminated field of view, the image sensor 180 may generate a monochrome (B/W) video signal. In a field of view illuminated by both IR light and visible light, the image sensor 180 may be configured to generate color information in addition to the monochrome video signal. In various embodiments, the image sensor 180 may be configured to generate a video signal in response to visible and/or infrared (IR) light.

In some embodiments, the camera sensor 180 may comprise a rolling shutter sensor or a global shutter sensor. In an example, the rolling shutter sensor 180 may implement an RGB-IR sensor. In some embodiments, the capture device 104 may comprise a rolling shutter IR sensor and an RGB sensor (e.g., implemented as separate components). In an example, the rolling shutter sensor 180 may be implemented as an RGB-IR rolling shutter complementary metal oxide semiconductor (CMOS) image sensor. In one example, the rolling shutter sensor 180 may be configured to assert a signal that indicates a first line exposure time. In one example, the rolling shutter sensor 180 may apply a mask to a monochrome sensor. In an example, the mask may comprise a plurality of units containing one red pixel, one green pixel, one blue pixel, and one IR pixel. The IR pixel may contain red, green, and blue filter materials that effectively absorb all of the light in the visible spectrum, while allowing the longer infrared wavelengths to pass through with minimal loss. With a rolling shutter, as each line (or row) of the sensor starts exposure, all pixels in the line (or row) may start exposure simultaneously.

The processor/logic 182 may transform the bitstream into a human viewable content (e.g., video data that may be understandable to an average person regardless of image quality, such as the video frames and/or pixel data that may be converted into video frames by the processor 102). For example, the processor/logic 182 may receive pure (e.g., raw) data from the image sensor 180 and generate (e.g., encode) video data (e.g., the bitstream) based on the raw data. The capture device 104 may have the memory 184 to store the raw data and/or the processed bitstream. For example, the capture device 104 may implement the frame memory and/or buffer 184 to store (e.g., provide temporary storage and/or cache) one or more of the video frames (e.g., the digital video signal). In some embodiments, the processor/logic 182 may perform analysis and/or correction on the video frames stored in the memory/buffer 184 of the capture device 104. The processor/logic 182 may provide status information about the captured video frames.

The IMU 106 may be configured to detect motion and/or movement of the camera system 100. The IMU 106 is shown receiving a signal (e.g., MTN). The signal MTN may comprise a combination of forces acting on the camera system 100. The signal MTN may comprise movement, vibrations, shakiness, a panning direction, jerkiness, etc. The signal MTN may represent movement in three dimensional space (e.g., movement in an X direction, a Y direction and a Z direction). The type and/or amount of motion received by the IMU 106 may be varied according to the design criteria of a particular implementation.

The IMU 106 may comprise a block (or circuit) 186. The circuit 186 may implement a motion sensor. In one example, the motion sensor 186 may be a gyroscope. The gyroscope 186 may be configured to measure the amount of movement. For example, the gyroscope 186 may be configured to detect an amount and/or direction of the movement of the signal MTN and convert the movement into electrical data. The IMU 106 may be configured to determine the amount of movement and/or the direction of movement measured by the gyroscope 186. The IMU 106 may convert the electrical data from the gyroscope 186 into a format readable by the processor 102. The IMU 106 may be configured to generate a signal (e.g., M_INFO). The signal M_INFO may comprise the measurement information in the format readable by the processor 102. The IMU 106 may present the signal M_INFO to the processor 102. The number, type and/or arrangement of the components of the IMU 106 and/or the number, type and/or functionality of the signals communicated by the IMU 106 may be varied according to the design criteria of a particular implementation.

The sensors 164 may implement a number of sensors including, but not limited to, motion sensors, ambient light sensors, proximity sensors (e.g., ultrasound, radar, passive infrared, lidar, etc.), audio sensors (e.g., a microphone), etc. In embodiments implementing a motion sensor, the sensors 164 may be configured to detect motion anywhere in the field of view monitored by the camera system 100 (or in some locations outside of the field of view). In various embodiments, the detection of motion may be used as one threshold for activating the capture device 104. The sensors 164 may be implemented as an internal component of the camera system 100 and/or as a component external to the camera system 100. In an example, the sensors 164 may be implemented as a passive infrared (PIR) sensor. In another example, the sensors 164 may be implemented as a smart motion sensor. In yet another example, the sensors 164 may be implemented as a microphone. In embodiments implementing the smart motion sensor, the sensors 164 may comprise a low resolution image sensor configured to detect motion and/or persons.

In various embodiments, the sensors 164 may generate a signal (e.g., SENS). The signal SENS may comprise a variety of data (or information) collected by the sensors 164. In an example, the signal SENS may comprise data collected in response to motion being detected in the monitored field of view, an ambient light level in the monitored field of view, and/or sounds picked up in the monitored field of view. However, other types of data may be collected and/or generated based upon design criteria of a particular application. The signal SENS may be presented to the processor/SoC 102. In an example, the sensors 164 may generate (assert) the signal SENS when motion is detected in the field of view monitored by the camera system 100. In another example, the sensors 164 may generate (assert) the signal SENS when triggered by audio in the field of view monitored by the camera system 100. In still another example, the sensors 164 may be configured to provide directional information with respect to motion and/or sound detected in the field of view. The directional information may also be communicated to the processor/SoC 102 via the signal SENS.

The HID 166 may implement an input device. For example, the HID 166 may be configured to receive human input. In one example, the HID 166 may be configured to receive a password input from a user. In another example, the HID 166 may be configured to receive user input in order to provide various parameters and/or settings to the processor 102 and/or the memory 150. In some embodiments, the camera system 100 may include a keypad, a touch pad (or screen), a doorbell switch, and/or other human interface devices (HIDs) 166. In an example, the sensors 164 may be configured to determine when an object is in proximity to the HIDs 166. In an example where the camera system 100 is implemented as part of an access control application, the capture device 104 may be turned on to provide images for identifying a person attempting access, and illumination of a lock area and/or for an access touch pad 166 may be turned on. For example, a combination of input from the HIDs 166 (e.g., a password or PIN number) may be combined with the liveness judgment and/or depth analysis performed by the processor 102 to enable two-factor authentication. The HID 166 may present a signal (e.g., USR) to the processor 102. The signal USR may comprise the input received by the HID 166.

In embodiments of the camera system 100 that implement a structured light projector, the structured light projector may comprise a structured light pattern lens and/or a structured light source. The structured source may be configured to generate a structured light pattern signal (e.g., a speckle pattern) that may be projected onto an environment near the camera system 100. The structured light pattern may be captured by the capture device 104 as part of the light input LIN. The structured light pattern lens may be configured to enable structured light generated by a structured light source of the structured light projector to be emitted while protecting the structured light source. The structured light pattern lens may be configured to decompose the laser light pattern generated by the structured light source into a pattern array (e.g., a dense dot pattern array for a speckle pattern).

In an example, the structured light source may be implemented as an array of vertical-cavity surface-emitting lasers (VCSELs) and a lens. However, other types of structured light sources may be implemented to meet design criteria of a particular application. In an example, the array of VCSELs is generally configured to generate a laser light pattern (e.g., the signal SLP). The lens is generally configured to decompose the laser light pattern to a dense dot pattern array. In an example, the structured light source may implement a near infrared (NIR) light source. In various embodiments, the light source of the structured light source may be configured to emit light with a wavelength of approximately 940 nanometers (nm), which is not visible to the human eye. However, other wavelengths may be utilized. In an example, a wavelength in a range of approximately 800-1000 nm may be utilized.

The processor/SoC 102 may receive the signal VIDEO, the signal M_INFO, the signal SENS, and the signal USR. The processor/SoC 102 may generate one or more video output signals (e.g., VIDOUT), one or more control signals (e.g., CTRL), one or more depth data signals (e.g., DIMAGES) and/or one or more warp table data signals (e.g., WT) based on the signal VIDEO, the signal M_INFO, the signal SENS, the signal USR and/or other input. In some embodiments, the signals VIDOUT, DIMAGES, WT and CTRL may be generated based on analysis of the signal VIDEO and/or objects detected in the signal VIDEO. In some embodiments, the signals VIDOUT, DIMAGES, WT and CTRL may be generated based on analysis of the signal VIDEO, the movement information captured by the IMU 106 and/or the intrinsic properties of the lens 160 and/or the capture device 104.

In various embodiments, the processor/SoC 102 may be configured to perform one or more of feature extraction, object detection, object tracking, electronic image stabilization, 3D reconstruction, liveness detection and object identification. For example, the processor/SoC 102 may determine motion information and/or depth information by analyzing a frame from the signal VIDEO and comparing the frame to a previous frame. The comparison may be used to perform digital motion estimation. In some embodiments, the processor/SoC 102 may be configured to generate the video output signal VIDOUT comprising video data, the warp table data signal WT and/or the depth data signal DIMAGES comprising disparity maps and depth maps from the signal VIDEO. The video output signal VIDOUT the warp table data signal WT and/or the depth data signal DIMAGES may be presented to the memory 150, the communications module 154, and/or the wireless interface 156. In some embodiments, the video signal VIDOUT the warp table data signal WT and/or the depth data signal DIMAGES may be used internally by the processor 102 (e.g., not presented as output). In one example, the warp table data signal WT may be used by a warp engine implemented by a digital signal processor (e.g., the processor 158).

The signal VIDOUT may be presented to the communication module 154 and/or the wireless interface 156. In some embodiments, the signal VIDOUT may comprise encoded video frames generated by the processor 102. In some embodiments, the encoded video frames may comprise a full video stream (e.g., encoded video frames representing all video captured by the capture device 104). The encoded video frames may be encoded, cropped, stitched, stabilized and/or enhanced versions of the pixel data received from the signal VIDEO. In an example, the encoded video frames may be a high resolution, digital, encoded, de-warped, stabilized, cropped, blended, stitched and/or rolling shutter effect corrected version of the signal VIDEO.

In some embodiments, the signal VIDOUT may be generated based on video analytics (e.g., computer vision operations) performed by the processor 102 on the video frames generated. The processor 102 may be configured to perform the computer vision operations to detect objects and/or events in the video frames and then convert the detected objects and/or events into statistics and/or parameters. In one example, the data determined by the computer vision operations may be converted to the human-readable format by the processor 102. The data from the computer vision operations may be used to detect objects and/or events. The computer vision operations may be performed by the processor 102 locally (e.g., without communicating to an external device to offload computing operations). Similarly other video processing and/or encoding operations (e.g., stabilization, compression, stitching, cropping, rolling shutter effect correction, etc.) may be performed by the processor 102 locally. For example, the locally performed computer vision operations may enable the computer vision operations to be performed by the processor 102 and avoid heavy video processing running on back-end servers. Avoiding video processing running on back-end (e.g., remotely located) servers may preserve privacy.

In some embodiments, the signal VIDOUT may be data generated by the processor 102 (e.g., video analysis results, audio/speech analysis results, stabilized video frames, etc.) that may be communicated to a cloud computing service in order to aggregate information and/or provide training data for machine learning (e.g., to improve object detection, to improve audio detection, to improve liveness detection, etc.). In some embodiments, the signal VIDOUT may be provided to a cloud service for mass storage (e.g., to enable a user to retrieve the encoded video using a smartphone and/or a desktop computer). In some embodiments, the signal VIDOUT may comprise the data extracted from the video frames (e.g., the results of the computer vision), and the results may be communicated to another device (e.g., a remote server, a cloud computing system, etc.) to offload analysis of the results to another device (e.g., offload analysis of the results to a cloud computing service instead of performing all the analysis locally). The type of information communicated by the signal VIDOUT may be varied according to the design criteria of a particular implementation.

The signal CTRL may be configured to provide a control signal. The signal CTRL may be generated in response to decisions made by the processor 102. In one example, the signal CTRL may be generated in response to objects detected and/or characteristics extracted from the video frames. The signal CTRL may be configured to enable, disable, change a mode of operation of another device. In one example, a door controlled by an electronic lock may be locked/unlocked in response the signal CTRL. In another example, a device may be set to a sleep mode (e.g., a low-power mode) and/or activated from the sleep mode in response to the signal CTRL. In yet another example, an alarm and/or a notification may be generated in response to the signal CTRL. The type of device controlled by the signal CTRL, and/or a reaction performed by of the device in response to the signal CTRL may be varied according to the design criteria of a particular implementation.

The signal CTRL may be generated based on data received by the sensors 164 (e.g., a temperature reading, a motion sensor reading, etc.). The signal CTRL may be generated based on input from the HID 166. The signal CTRL may be generated based on behaviors of people detected in the video frames by the processor 102. The signal CTRL may be generated based on a type of object detected (e.g., a person, an animal, a vehicle, etc.). The signal CTRL may be generated in response to particular types of objects being detected in particular locations. The signal CTRL may be generated in response to user input in order to provide various parameters and/or settings to the processor 102 and/or the memory 150. The processor 102 may be configured to generate the signal CTRL in response to sensor fusion operations (e.g., aggregating information received from disparate sources). The processor 102 may be configured to generate the signal CTRL in response to results of liveness detection performed by the processor 102. The conditions for generating the signal CTRL may be varied according to the design criteria of a particular implementation.

The signal DIMAGES may comprise one or more of depth maps and/or disparity maps generated by the processor 102. The signal DIMAGES may be generated in response to 3D reconstruction performed on the monocular single-channel images. The signal DIMAGES may be generated in response to analysis of the captured video data and the structured light pattern.

The multi-step approach to activating and/or disabling the capture device 104 based on the output of the motion sensor 164 and/or any other power consuming features of the camera system 100 may be implemented to reduce a power consumption of the camera system 100 and extend an operational lifetime of the battery 152. A motion sensor of the sensors 164 may have a low drain on the battery 152 (e.g., less than 10 W). In an example, the motion sensor of the sensors 164 may be configured to remain on (e.g., always active) unless disabled in response to feedback from the processor/SoC 102. The video analytics performed by the processor/SoC 102 may have a relatively large drain on the battery 152 (e.g., greater than the motion sensor 164). In an example, the processor/SoC 102 may be in a low-power state (or power-down) until some motion is detected by the motion sensor of the sensors 164.

The camera system 100 may be configured to operate using various power states. For example, in the power-down state (e.g., a sleep state, a low-power state) the motion sensor of the sensors 164 and the processor/SoC 102 may be on and other components of the camera system 100 (e.g., the image capture device 104, the memory 150, the communications module 154, etc.) may be off. In another example, the camera system 100 may operate in an intermediate state. In the intermediate state, the image capture device 104 may be on and the memory 150 and/or the communications module 154 may be off. In yet another example, the camera system 100 may operate in a power-on (or high power) state. In the power-on state, the sensors 164, the processor/SoC 102, the capture device 104, the memory 150, and/or the communications module 154 may be on. The camera system 100 may consume some power from the battery 152 in the power-down state (e.g., a relatively small and/or minimal amount of power). The camera system 100 may consume more power from the battery 152 in the power-on state. The number of power states and/or the components of the camera system 100 that are on while the camera system 100 operates in each of the power states may be varied according to the design criteria of a particular implementation.

In some embodiments, the camera system 100 may be implemented as a system on chip (SoC). For example, the camera system 100 may be implemented as a printed circuit board comprising one or more components. The camera system 100 may be configured to perform intelligent video analysis on the video frames of the video. The camera system 100 may be configured to crop and/or enhance the video.

In some embodiments, the video frames may be some view (or derivative of some view) captured by the capture device 104. The pixel data signals may be enhanced by the processor 102 (e.g., color conversion, noise filtering, auto exposure, auto white balance, auto focus, etc.). In some embodiments, the video frames may provide a series of cropped and/or enhanced video frames that improve upon the view from the perspective of the camera system 100 (e.g., provides night vision, provides High Dynamic Range (HDR) imaging, provides more viewing area, highlights detected objects, provides additional data such as a numerical distance to detected objects, etc.) to enable the processor 102 to see the location better than a person would be capable of with human vision.

The encoded video frames may be processed locally. In one example, the encoded video may be stored locally by the memory 150 to enable the processor 102 to facilitate the computer vision analysis internally (e.g., without first uploading video frames to a cloud service). The processor 102 may be configured to select the video frames to be packetized as a video stream that may be transmitted over a network (e.g., a bandwidth limited network).

In some embodiments, the processor 102 may be configured to perform sensor fusion operations. The sensor fusion operations performed by the processor 102 may be configured to analyze information from multiple sources (e.g., the capture device 104, the IMU 106, the sensors 164 and the HID 166). By analyzing various data from disparate sources, the sensor fusion operations may be capable of making inferences about the data that may not be possible from one of the data sources alone. For example, the sensor fusion operations implemented by the processor 102 may analyze video data (e.g., mouth movements of people) as well as the speech patterns from directional audio. The disparate sources may be used to develop a model of a scenario to support decision making. For example, the processor 102 may be configured to compare the synchronization of the detected speech patterns with the mouth movements in the video frames to determine which person in a video frame is speaking. The sensor fusion operations may also provide time correlation, spatial correlation and/or reliability among the data being received.

In some embodiments, the processor 102 may implement convolutional neural network capabilities. The convolutional neural network capabilities may implement computer vision using deep learning techniques. The convolutional neural network capabilities may be configured to implement pattern and/or image recognition using a training process through multiple layers of feature-detection. The computer vision and/or convolutional neural network capabilities may be performed locally by the processor 102. In some embodiments, the processor 102 may receive training data and/or feature set information from an external source. For example, an external device (e.g., a cloud service) may have access to various sources of data to use as training data that may be unavailable to the camera system 100. However, the computer vision operations performed using the feature set may be performed using the computational resources of the processor 102 within the camera system 100.

A video pipeline of the processor 102 may be configured to locally perform de-warping, cropping, enhancements, rolling shutter corrections, stabilizing, downscaling, packetizing, compression, conversion, blending, synchronizing and/or other video operations. The video pipeline of the processor 102 may enable multi-stream support (e.g., generate multiple bitstreams in parallel, each comprising a different bitrate). In an example, the video pipeline of the processor 102 may implement an image signal processor (ISP) with a 320 MPixels/s input pixel rate. The architecture of the video pipeline of the processor 102 may enable the video operations to be performed on high resolution video and/or high bitrate video data in real-time and/or near real-time. The video pipeline of the processor 102 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline may enable 4K ultra high resolution with H.264 encoding at double real time speed (e.g., 60 fps), 4K ultra high resolution with H.265/HEVC at 30 fps and/or 4K AVC encoding (e.g., 4KP30 AVC and HEVC encoding with multi-stream support). The type of video operations and/or the type of video data operated on by the processor 102 may be varied according to the design criteria of a particular implementation.

The camera sensor 180 may implement a high-resolution sensor. Using the high resolution sensor 180, the processor 102 may combine over-sampling of the image sensor 180 with digital zooming within a cropped area. The over-sampling and digital zooming may each be one of the video operations performed by the processor 102. The over-sampling and digital zooming may be implemented to deliver higher resolution images within the total size constraints of a cropped area.

In some embodiments, the lens 160 may implement a fisheye lens. One of the video operations implemented by the processor 102 may be a dewarping operation. The processor 102 may be configured to dewarp the video frames generated. The dewarping may be configured to reduce and/or remove acute distortion caused by the fisheye lens and/or other lens characteristics. For example, the dewarping may reduce and/or eliminate a bulging effect to provide a rectilinear image.

The processor 102 may be configured to crop (e.g., trim to) a region of interest from a full video frame (e.g., generate the region of interest video frames). The processor 102 may generate the video frames and select an area. In an example, cropping the region of interest may generate a second image. The cropped image (e.g., the region of interest video frame) may be smaller than the original video frame (e.g., the cropped image may be a portion of the captured video).

The area of interest may be dynamically adjusted based on the location of an audio source. For example, the detected audio source may be moving, and the location of the detected audio source may move as the video frames are captured. The processor 102 may update the selected region of interest coordinates and dynamically update the cropped section (e.g., directional microphones implemented as one or more of the sensors 164 may dynamically update the location based on the directional audio captured). The cropped section may correspond to the area of interest selected. As the area of interest changes, the cropped portion may change. For example, the selected coordinates for the area of interest may change from frame to frame, and the processor 102 may be configured to crop the selected region in each frame.

The processor 102 may be configured to over-sample the image sensor 180. The over-sampling of the image sensor 180 may result in a higher resolution image. The processor 102 may be configured to digitally zoom into an area of a video frame. For example, the processor 102 may digitally zoom into the cropped area of interest. For example, the processor 102 may establish the area of interest based on the directional audio, crop the area of interest, and then digitally zoom into the cropped region of interest video frame.

The dewarping operations performed by the processor 102 may adjust the visual content of the video data. The adjustments performed by the processor 102 may cause the visual content to appear natural (e.g., appear as seen by a person viewing the location corresponding to the field of view of the capture device 104). In an example, the dewarping may alter the video data to generate a rectilinear video frame (e.g., correct artifacts caused by the lens characteristics of the lens 160). The dewarping operations may be implemented to correct the distortion caused by the lens 160. The adjusted visual content may be generated to enable more accurate and/or reliable object detection.

Various features (e.g., dewarping, digitally zooming, cropping, etc.) may be implemented in the processor 102 as hardware modules. Implementing hardware modules may increase the video processing speed of the processor 102 (e.g., faster than a software implementation). The hardware implementation may enable the video to be processed while reducing an amount of delay. The hardware components used may be varied according to the design criteria of a particular implementation.

In some embodiments, the processor 102 may implement one or more coprocessors, cores and/or chiplets. For example, the processor 102 may implement one coprocessor configured as a general purpose processor and another coprocessor configured as a video processor. In some embodiments, the processor 102 may be a dedicated hardware module designed to perform particular tasks. In an example, the processor 102 may implement an AI accelerator. In another example, the processor 102 may implement a radar processor. In yet another example, the processor 102 may implement a dataflow vector processor. In some embodiments, other processors implemented by the apparatus 100 may be generic processors and/or video processors (e.g., a coprocessor that is physically a different chipset and/or silicon from the processor 102). In one example, the processor 102 may implement an x86-64 instruction set. In another example, the processor 102 may implement an ARM instruction set. In yet another example, the processor 102 may implement a RISC-V instruction set. The number of cores, coprocessors, the design optimization and/or the instruction set implemented by the processor 102 may be varied according to the design criteria of a particular implementation.

The processor 102 is shown comprising a number of blocks (or circuits) 190*a*-190*n*. The blocks 190*a*-190*n* may implement various hardware modules implemented by the processor 102. The hardware modules 190*a*-190*n* may be configured to provide various hardware components to implement a video processing pipeline, a radar signal processing pipeline and/or an AI processing pipeline. The circuits 190*a*-190*n* may be configured to receive the pixel data VIDEO, generate the video frames from the pixel data, perform various operations on the video frames (e.g., dewarping, rolling shutter correction, cropping, upscaling, image stabilization, 3D reconstruction, liveness detection, auto-exposure, etc.), prepare the video frames for communication to external hardware (e.g., encoding, packetizing, color correcting, etc.), parse feature sets, implement various operations for computer vision (e.g., object detection, segmentation, classification, etc.), etc. The hardware modules 190*a*-190*n* may be configured to implement various security features (e.g., secure boot, I/O virtualization, etc.). Various implementations of the processor 102 may not necessarily utilize all the features of the hardware modules 190*a*-190*n*. The features and/or functionality of the hardware modules 190*a*-190*n* may be varied according to the design criteria of a particular implementation. Details of the hardware modules 190*a*-190*n* may be described in association with U.S. patent application Ser. No. 16/831,549, filed on Apr. 16, 2020 (now U.S. Pat. No. 11,586,843), U.S. patent application Ser. No. 16/288,922, filed on Feb. 28, 2019 (now U.S. Pat. No 11,001,231), U.S. patent application Ser. No. 15/593,463, filed on May 12, 2017 (now U.S. Pat. No. 10,437,600), U.S. patent application Ser. No. 15/931,942, filed on May 14, 2020 (now U.S. Pat. 11,645,706), U.S. patent application Ser. No. 16/991,344, filed on Aug. 12, 2020 (now U.S. Pat. No. 12,374,107), U.S. patent application Ser. No. 17/479,034, filed on Sep. 20, 2021 (now U.S. Pat. No. 12,002,229), appropriate portions of which are hereby incorporated by reference in their entirety.

The hardware modules 190*a*-190*n* may be implemented as dedicated hardware modules. Implementing various functionality of the processor 102 using the dedicated hardware modules 190*a*-190*n* may enable the processor 102 to be highly optimized and/or customized to limit power consumption, reduce heat generation and/or increase processing speed compared to software implementations. The hardware modules 190*a*-190*n* may be customizable and/or programmable to implement multiple types of operations. Implementing the dedicated hardware modules 190*a*-190*n* may enable the hardware used to perform each type of calculation to be optimized for speed and/or efficiency. For example, the hardware modules 190*a*-190*n* may implement a number of relatively simple operations that are used frequently in computer vision operations that, together, may enable the computer vision operations to be performed in real-time. The video pipeline may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects. The hardware modules 190*a*-190*n* may enable computationally intensive operations (e.g., computer vision operations, video encoding, video transcoding, 3D reconstruction, depth map generation, liveness detection, etc.) to be performed locally by the camera system 100.

One of the hardware modules 190*a*-190*n* (e.g., 190*a*) may implement a scheduler circuit. The scheduler circuit 190*a* may be configured to store a directed acyclic graph (DAG). In an example, the scheduler circuit 190*a* may be configured to generate and store the directed acyclic graph in response to the feature set information received (e.g., loaded). The directed acyclic graph may define the video operations to perform for extracting the data from the video frames. For example, the directed acyclic graph may define various mathematical weighting (e.g., neural network weights and/or biases) to apply when performing computer vision operations to classify various groups of pixels as particular objects.

The scheduler circuit 190*a* may be configured to parse the acyclic graph to generate various operators. The operators may be scheduled by the scheduler circuit 190*a* in one or more of the other hardware modules 190*a*-190*n*. For example, one or more of the hardware modules 190*a*-190*n* may implement hardware engines configured to perform specific tasks (e.g., hardware engines designed to perform particular mathematical operations that are repeatedly used to perform computer vision operations). The scheduler circuit 190*a* may schedule the operators based on when the operators may be ready to be processed by the hardware engines 190*a*-190*n*.

The scheduler circuit 190*a* may time multiplex the tasks to the hardware modules 190*a*-190*n* based on the availability of the hardware modules 190*a*-190*n* to perform the work. The scheduler circuit 190*a* may parse the directed acyclic graph into one or more data flows. Each data flow may include one or more operators. Once the directed acyclic graph is parsed, the scheduler circuit 190*a* may allocate the data flows/operators to the hardware engines 190*a*-190*n* and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One of the hardware modules 190*a*-190*n* (e.g., 190*b*) may implement an artificial neural network (ANN) module. The artificial neural network module may be implemented as a fully connected neural network or a convolutional neural network (CNN). In an example, fully connected networks are "structure agnostic" in that there are no special assumptions that need to be made about an input. A fully-connected neural network comprises a series of fully-connected layers that connect every neuron in one layer to every neuron in the other layer. In a fully-connected layer, for n inputs and m outputs, there are n*m weights. There is also a bias value for each output node, resulting in a total of (n+1)*m parameters. In an already-trained neural network, the (n+1)*m parameters have already been determined during a training process. An already-trained neural network generally comprises an architecture specification and the set of parameters (weights and biases) determined during the training process. In another example, CNN architectures may make explicit assumptions that the inputs are images to enable encoding particular properties into a model architecture. The CNN architecture may comprise a sequence of layers with each layer transforming one volume of activations to another through a differentiable function.

In the example shown, the artificial neural network 190*b* may implement a convolutional neural network (CNN) module. The CNN module 190*b* may be configured to perform the computer vision operations on the video frames. The CNN module 190*b* may be configured to implement recognition of objects through multiple layers of feature detection. The CNN module 190*b* may be configured to calculate descriptors based on the feature detection performed. The descriptors may enable the processor 102 to determine a likelihood that pixels of the video frames correspond to particular objects (e.g., a particular make/model/year of a vehicle, identifying a person as a particular individual, detecting a type of animal, detecting characteristics of a face, etc.).

The CNN module 190*b* may be configured to implement convolutional neural network capabilities. The CNN module 190*b* may be configured to implement computer vision using deep learning techniques. The CNN module 190*b* may be configured to implement pattern and/or image recognition using a training process through multiple layers of feature-detection. The CNN module 190*b* may be configured to conduct inferences against a machine learning model.

The CNN module 190*b* may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching operation is generally incorporated by hardware in the CNN module 190*b* to find the most probable correspondences between feature points in a reference video frame and a target video frame. In a process to match pairs of reference and target feature points, each feature point may be represented by a descriptor (e.g., image patch, SIFT, BRIEF, ORB, FREAK, etc.). Implementing the CNN module 190*b* using dedicated hardware circuitry may enable calculating descriptor matching distances in real time.

The CNN module 190*b* may be configured to perform face detection, face recognition and/or liveness judgment. For example, face detection, face recognition and/or liveness judgment may be performed based on a trained neural network implemented by the CNN module 190*b*. In some embodiments, the CNN module 190*b* may be configured to generate the depth image from the structured light pattern. The CNN module 190*b* may be configured to perform various detection and/or recognition operations and/or perform 3D recognition operations.

The CNN module 190*b* may be a dedicated hardware module configured to perform feature detection of the video frames. The features detected by the CNN module 190*b* may be used to calculate descriptors. The CNN module 190*b* may determine a likelihood that pixels in the video frames belong to a particular object and/or objects in response to the descriptors. For example, using the descriptors, the CNN module 190*b* may determine a likelihood that pixels correspond to a particular object (e.g., a person, an item of furniture, a pet, a vehicle, etc.) and/or characteristics of the object (e.g., shape of eyes, distance between facial features, a hood of a vehicle, a body part, a license plate of a vehicle, a face of a person, clothing worn by a person, etc.). Implementing the CNN module 190*b* as a dedicated hardware module of the processor 102 may enable the apparatus 100 to perform the computer vision operations locally (e.g., on-chip) without relying on processing capabilities of a remote device (e.g., communicating data to a cloud computing service).

The computer vision operations performed by the CNN module 190*b* may be configured to perform the feature detection on the video frames in order to generate the descriptors. The CNN module 190*b* may perform the object detection to determine regions of the video frame that have a high likelihood of matching the particular object. In one example, the types of object(s) to match against (e.g., reference objects) may be customized using an open operand stack (enabling programmability of the processor 102 to implement various artificial neural networks defined by directed acyclic graphs each providing instructions for performing various types of object detection). The CNN module 190*b* may be configured to perform local masking to the region with the high likelihood of matching the particular object(s) to detect the object.

In some embodiments, the CNN module 190*b* may determine the position (e.g., 3D coordinates and/or location coordinates) of various features (e.g., the characteristics) of the detected objects. In one example, the location of the arms, legs, chest and/or eyes of a person may be determined using 3D coordinates. One location coordinate on a first axis for a vertical location of the body part in 3D space and another coordinate on a second axis for a horizontal location of the body part in 3D space may be stored. In some embodiments, the distance from the lens 160 may represent one coordinate (e.g., a location coordinate on a third axis) for a depth location of the body part in 3D space. Using the location of various body parts in 3D space, the processor 102 may determine body position, and/or body characteristics of detected people.

The CNN module 190*b* may be pre-trained (e.g., configured to perform computer vision to detect objects based on the training data received to train the CNN module 190*b*). For example, the results of training data (e.g., a machine learning model) may be pre-programmed and/or loaded into the processor 102. The CNN module 190*b* may conduct inferences against the machine learning model (e.g., to perform object detection). The training may comprise determining weight values for each layer of the neural network model. For example, weight values may be determined for each of the layers for feature extraction (e.g., a convolutional layer) and/or for classification (e.g., a fully connected layer). The weight values learned by the CNN module 190*b* may be varied according to the design criteria of a particular implementation.

The CNN module 190*b* may implement the feature extraction and/or object detection by performing convolution operations. The convolution operations may be hardware accelerated for fast (e.g., real-time) calculations that may be performed while consuming low power. In some embodiments, the convolution operations performed by the CNN module 190*b* may be utilized for performing the computer vision operations. In some embodiments, the convolution operations performed by the CNN module 190*b* may be utilized for any functions performed by the processor 102 that may involve calculating convolution operations (e.g., 3D reconstruction).

The convolution operation may comprise sliding a feature detection window along the layers while performing calculations (e.g., matrix operations). The feature detection window may apply a filter to pixels and/or extract features associated with each layer. The feature detection window may be applied to a pixel and a number of surrounding pixels. In an example, the layers may be represented as a matrix of values representing pixels and/or features of one of the layers and the filter applied by the feature detection window may be represented as a matrix. The convolution operation may apply a matrix multiplication between the region of the current layer covered by the feature detection window. The convolution operation may slide the feature detection window along regions of the layers to generate a result representing each region. The size of the region, the type of operations applied by the filters and/or the number of layers may be varied according to the design criteria of a particular implementation.

Using the convolution operations, the CNN module 190*b* may compute multiple features for pixels of an input image in each extraction step. For example, each of the layers may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window operates on a pixel and nearby pixels (or sub-pixels), the results of the operation may have location invariance. The layers may comprise convolution layers, pooling layers, non-linear layers and/or fully connected layers. In an example, the convolution operations may learn to detect edges from raw pixels (e.g., a first layer), then use the feature from the previous layer (e.g., the detected edges) to detect shapes in a next layer and then use the shapes to detect higher-level features (e.g., facial features, pets, vehicles, components of a vehicle, furniture, etc.) in higher layers and the last layer may be a classifier that uses the higher level features.

The CNN module 190*b* may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 190*b* to extract features from the training data may be varied according to the design criteria of a particular implementation.

One or more of the hardware modules 190*a*-190*n* may be configured to implement other types of AI models. In one example, the hardware modules 190*a*-190*n* may be configured to implement an image-to-text AI model and/or a video-to-text AI model. In another example, the hardware modules 190*a*-190*n* may be configured to implement a Large Language Model (LLM). Implementing the AI model (s) using the hardware modules 190*a*-190*n* may provide AI acceleration that may enable complex AI tasks to be performed on an edge device such as the edge devices 100*a*-100*n*.

One of the hardware modules 190*a*-190*n* may be configured to perform the virtual aperture imaging. One of the hardware modules 190*a*-190*n* may be configured to perform transformation operations (e.g., FFT, DCT, DFT, etc.). The number, type and/or operations performed by the hardware modules 190*a*-190*n* may be varied according to the design criteria of a particular implementation.

Each of the hardware modules 190*a*-190*n* may implement a processing resource (or hardware resource or hardware engine). The hardware engines 190*a*-190*n* may be operational to perform specific processing tasks. In some configurations, the hardware engines 190*a*-190*n* may operate in parallel and independent of each other. In other configurations, the hardware engines 190*a*-190*n* may operate collectively among each other to perform allocated tasks. One or more of the hardware engines 190*a*-190*n* may be homogeneous processing resources (all circuits 190*a*-190*n* may have the same capabilities) or heterogeneous processing resources (two or more circuits 190*a*-190*n* may have different capabilities).

Figure 4:
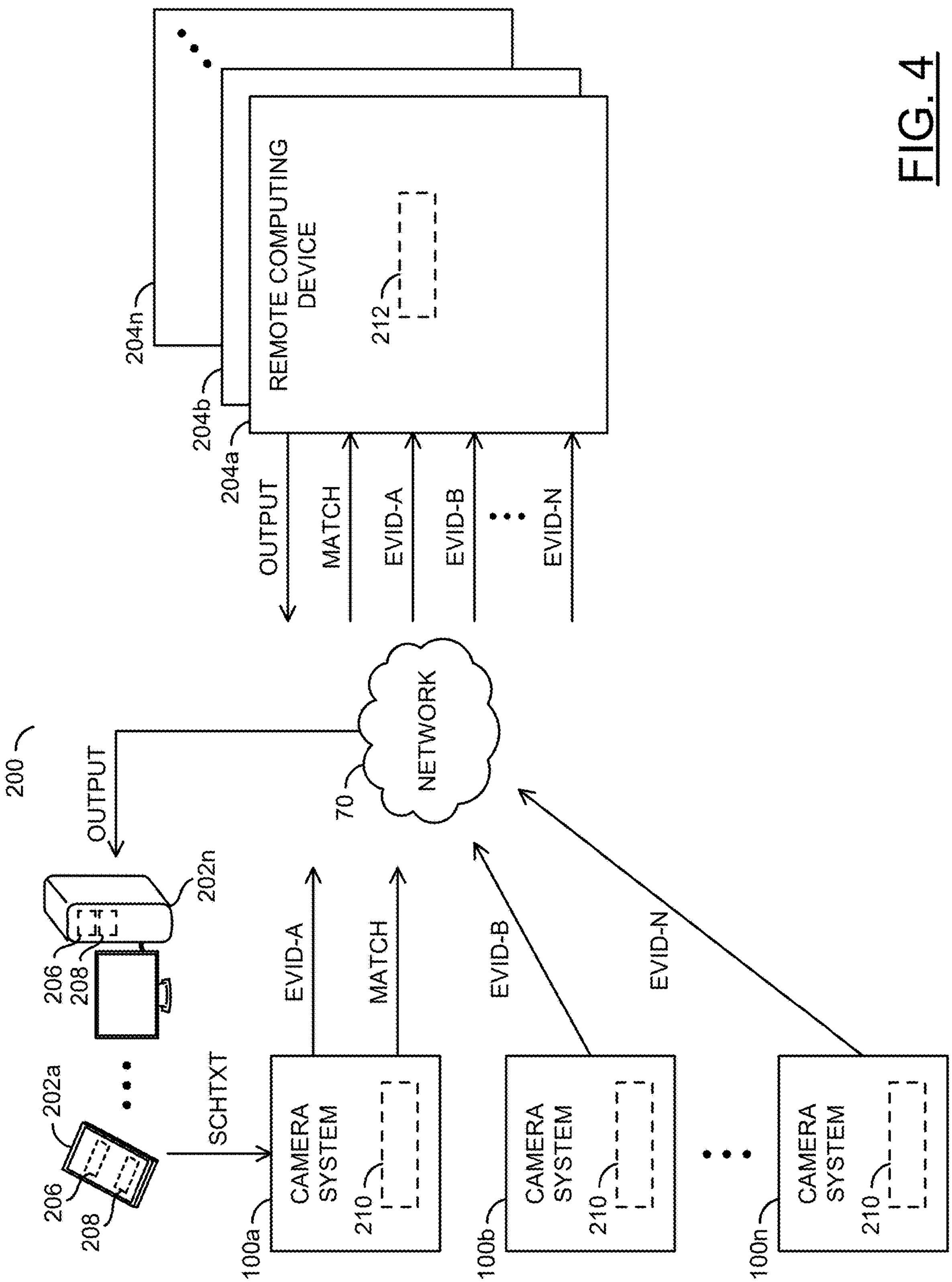
FIG. 4 is a block diagram illustrating a system implementing a video question-answer configuration based on a two-stage camera-based video search.

Referring to FIG. 4, a block diagram illustrating a system implementing a video question-answer configuration based on a two-stage camera-based video search is shown. A system 200 is shown. The system 200 may comprise a video question-answer search system.

The video question-answer search system 200 may comprise the camera systems 100*a*-100*n*, a network 70, blocks (or circuits) 202*a*-202*n* and/or blocks (or circuits) 204*a*-204*n*. The network 70 may be a local network and/or a wide area network. In one example, the network 70 may be the internet. The blocks 202*a*-202*n* may implement user devices. The blocks 204*a*-204*n* may implement one or more remote computing devices. The video question-answer search system 200 may comprise other components (not shown). The number, type and/or arrangement of the components of the video question-answer search system 200 may be varied according to the design criteria of a particular implementation.

The camera systems 100*a*-100*n* may be configured to communicate with the network 70. In some embodiments, the network 70 may be a local area network (LAN). For example, the camera systems 100*a*-100*n* may be implemented at a single property to provide a surveillance system for the premises, and the network 70 may connect the camera systems 100*a*-100*n* to a local (e.g., on-premises) computing device (e.g., one or more of the remote computing devices 204*a*-204*n*). In some embodiments, the network 70 may be the internet. For example, one or more of the remote computing devices 204*a*-204*n* may implement a local AI computing device. In one example, the camera systems 100*a*-100*n* may be surveillance cameras monitoring a single property, and the network 70 may connect the camera systems 100*a*-100*n* to a cloud computing service comprising the remote computing devices 204*a*-204*n* (e.g., a third-party service that provides data center(s) and/or server farms that offers computational resources that may be used for video surveillance services for a property owner). In another example, the camera systems 100*a*-100*n* may be surveillance cameras monitoring multiple properties, and the network 70 may connect the camera systems 100*a*-100*n* that may be at different locations (e.g., different buildings, cities, countries, etc.) to the cloud computing service comprising the remote computing devices 204*a*-204*n*. The arrangement of the connection between the camera systems 100*a*-100*n* and the remote computing devices 204*a*-204*n* over the network 70 may be varied according to the design criteria of a particular implementation.

The user devices 202*a*-202*n* may each be a device separate from the edge devices 100*a*-100*n*. The user devices 202*a*-202*n* may be configured to connect to the edge devices 100*a*-100*n* (e.g., via the communication module 154 and/or the wireless interface 156). In some embodiments, the user devices 202*a*-202*n* may connect directly to one or more of the edge devices 100*a*-100*n* (e.g., a peer-to-peer connection). In some embodiments, the user devices 202*a*-202*n* may connect to the network 70 comprising the edge devices 100*a*-100*n* (e.g., a local area network, a third party service that facilitates connecting to the edge devices 100*a*-100*n*, the cloud computing service 204*a*-204*n*). The method of connecting the user devices 202*a*-202*n* to the edge devices 100*a*-100*n* may be varied according to the design criteria of a particular implementation.

The user devices 202*a*-202*n* may represent various user devices. In one example, the user device 202*a* may be a smartphone. In another example, the user device 202*n* may be a desktop computer. In yet another example, one or more of the user devices 202*a*-202*n* may be implemented as a laptop computer, a tablet computing device, a smartwatch, a security terminal, etc. For example, a consumer end-user (e.g., a home owner) may use the smartphone embodiment of the user device 202*a*. In another example, a professional end-user (e.g., a security agent) may use the computer embodiment of the user device 202*n*. The types of devices used as the user devices 202*a*-202*n* may be varied according to the design criteria of a particular implementation.

The user devices 202*a*-202*n* may enable end users to communicate with the edge devices 100*a*-100*n* and/or other networks. The user devices 202*a*-202*n* may each comprise block (or circuit) 206 and/or a block (or circuit) 208. The circuit 206 may represent computing hardware (e.g., memory, processor, GPU, modem, etc.). The block 208 may implement computer readable instructions configured to implement a companion app. The companion app 208 may be executed by the computing hardware 206. In one example, the companion application 208 may be configured to operate on the user devices 202*a*-202*n*. The companion application 208 may enable users to adjust settings of the edge devices 100*a*-100*n*. The companion application 208 may enable users to view video captured by the edge devices 100*a*-100*n* (e.g., directly from the edge devices 100*a*-100*n* and/or streamed via the cloud service 204*a*-204*n*). Generally, the computing hardware 206 of the user devices 202*a*-202*n* may comprise a display (e.g., for image and/or video output), a speaker (e.g., for audio output), an input device (e.g., a keyboard, a touchscreen display, a microphone, etc.) and/or a communication device.

The user devices 202*a*-202*n* may enable an end user to provide input to one or more of the edge devices 100*a*-100*n*. For example, the end user may set various preferences. The preferences may comprise the types of notifications to receive (e.g., text, push, audio, etc.), the types of events to receive notifications about (e.g., types of objects to detect, faces to detect, thresholds for factors such as audio and motion thresholds, etc.) and/or urgency level (e.g., alert threshold) settings. The user devices 202*a*-202*n* may enable the end user to enter queries for searching video data captured, provide criteria for notification rules, view text descriptions of objects detected, view text descriptions of the video data, receive security alerts, etc. The user devices 202*a*-202*n* may enable the end user to tag video captured for providing training data to the various AI models. While the user devices 202*a*-202*n* may enable the end user to interact with the camera systems 100*a*-100*n*, the HID 166 may also enable similar interaction (e.g., using the I/O on the camera systems 100*a*-100*n* directly).

The user devices 202*a*-202*n* may enable the end user to receive output from one or more of the edge devices 100*a*-100*n*. In one example, the end user may receive notifications from the edge devices 100*a*-100*n* (or through an intermediary such as the cloud computing service 204*a*-204*n*) via the user devices 202*a*-202*n*. In another example, the end user may receive a video stream from the edge devices 100*a*-100*n* via the user devices 202*a*-202*n*. In yet another example, the end user may receive search results in response to a query (e.g., selective portions of the video data captured and/or plain text descriptions of the visual elements of the video data) from the edge devices 100*a*-100*n* and/or the cloud computing services 204*a*-204*n* via the user devices 202*a*-202*n*.

The remote computing devices 204*a*-204*n* may implement a scalable computing service (e.g., a cloud computing service). The scalable computing service 204*a*-204*n* may be configured to store data, retrieve and transmit stored data, process data and/or communicate with other devices (e.g., the camera systems 100*a*-100*n*, the user devices 202*a*-202*n*, etc.). The scalable computing service 204*a*-204*n* may be implemented as part of a cloud computing platform (e.g., distributed computing). In an example, the scalable computing service 204*a*-204*n* may be implemented as a group of cloud-based, scalable server computers. By implementing a number of scalable servers, additional resources (e.g., power, processing capability, memory, etc.) may be available to process and/or store variable amounts of data. For example, the scalable computing service 204*a*-204*n* may be configured to scale (e.g., provision resources) based on demand. The scalable computing services 204*a*-204*n* may implement scalable computing (e.g., cloud computing). The scalable computing may be available as a service to allow access to processing and/or storage resources without having to build infrastructure (e.g., the provider of the camera systems 100*a*-100*n* may not have to build the infrastructure of the scalable computing service). Details of the one or more of the remote computing devices 204*a*-204*n* that implement the scalable computing service may be described in association with FIG. 5.

Each of the camera systems 100*a*-100*n* may be configured to process pixel data arranged as video frames. The camera systems 100*a*-100*n* may comprise the processor 102 to perform video operations. The camera systems 100*a*-100*n* may generate encoded video frames. For example, the video operations may comprise encoding operations. Each of the camera systems 100*a*-100*n* may comprise a block (or circuit) 210. The circuit 210 may implement an AI model. For example, AI model 210 may be a draft AI model. The draft AI model 210 may be implemented using one or more of the hardware modules 190*a*-190*n* of the processor 102.

The remote computing devices 204*a*-204*n* may comprise a block (or circuit) 212. The circuit 212 may be an AI model. The AI model 212 may be different from the AI model 210 implemented by the camera systems 100*a*-100*n*. For example, the processing capability of the remote computing devices 204*a*-204*n* may enable the AI model 212 to be more powerful (e.g., access more memory capacity, use more computing resources, consume more power, etc.) than the AI model 210 implemented by the processor 102 and/or the memory 150 local to the camera systems 100*a*-100*n* (e.g., limited by the constraints of the hardware and/or the power budget available). In some embodiments, the AI model 212 may be a full AI model and the AI model 210 may be a draft AI model version of the full AI model 212. In one example, the full AI model 212 may be a full Vision Language Model (VLM). In another example, the full AI model 212 may be a Video Large Language Model (VLLM). In yet another example, the full AI model 212 may be a Large Language and Vision Assistant (LLaVA). In one example, the draft AI model 210 may be a Contrastive Language-Image Pretraining (CLIP) neural network AI model. The type of the full AI model 212, the type of the draft AI model 210 and/or the relationship between the full AI model 212 and the draft AI model 210 may be varied according to the design criteria of a particular implementation.

The user devices 202*a*-202*n* may be configured to generate a signal (e.g., SCHTXT). The user devices 202*a*-202*n* may be configured to receive a signal (e.g., OUTPUT). The signal SCHTXT may be presented to one or more of the camera systems 100*a*-100*n*. In the example shown, the signal SCHTXT may be presented to the camera system 100*a*. In some embodiments, the signal SCHTXT may be presented to the network 70 and the network 70 may present the signal SCHTXT to one or more of the camera systems 100*a*-100*n*. The signal OUTPUT may be received by the user devices 202*a*-202*n* from the network 70 and/or the remote computing devices 204*a*-204*n*.

The signal SCHTXT may comprise input by an end-user. For example, the end-user (e.g., a person such as a homeowner, a business owner, a property owner, a family member, etc.) may provide input using the companion app 208. The input by the end-user may be a natural text description for a prompt. In an example, the natural text description may be a query. The signal SCHTXT may comprise a plain text and/or natural language question for a video question-answer interface implemented by the companion app 208 for the video question-answer system 200. The end user may use the companion app 208 to input criteria for natural language search parameters. For example, the end user may input a question and/or a request such as, "Were there any dangerous looking people on my property?", "Did anyone approach my porch after a package was delivered?", "Did anyone attempt to open my front door?", etc. The end-user input provided using the user devices 202*a*-202*n* may be presented to the draft AI model 210 as the signal SCHTXT. The signal SCHTXT may further comprise information about the user devices 202*a*-202*n*. For example, the signal SCHTXT may comprise a device ID and/or video playback capability information about the particular user device that provided the query.

The draft AI model 210 may be configured to parse the natural text input of the signal SCHTXT to determine a query and/or search parameters. For example, a text encoder implemented by the draft AI model 210 may transform input text into a numerical representation and/or embedding that may be processed by the machine learning model(s) implemented by the draft AI model 210. The draft AI model 210 may be configured to search the video frames generated by the processor 102. For example, a vision encoder implemented by the draft AI model 210 may determine image-text pairs for the video frames and compare the image-text pairs to the search parameters of the input prompt. In an example, the draft AI model 210 may search video frames in real time. The draft AI model 210 may be configured to search the video frames based on the query and/or search parameters. The draft AI model 210 may determine whether any of the visual data in the video frames matches the search parameters. In response to detecting a match of the visual data of a video frame to the search parameters, the draft AI model

210 may generate image match data. In one example, the image match data may comprise a video frame number and/or a timestamp of the video frame comprising the visual data match. In another example, the image match data may comprise a device ID of the particular one of the camera systems 100*a*-100*n* that provided the image match data. In yet another example, the image match data may comprise the device ID and/or video playback capabilities of the user devices 202*a*-202*n* that provided the input prompt. The draft AI model 210 may generate a signal (e.g., MATCH). The signal MATCH may comprise the image match data. The signal MATCH may be generated in response to the user input (e.g., the signal SCHTXT) and the video frames.

Each of the camera systems 100*a*-100*n* may generate a respective signal (e.g., EVID-A-EVID-N). The signals EVID-A-EVID-N may comprise encoded video frames. For example, each of the camera systems 100*a*-100*n* may generate encoded video frames in response to the encoding operations performed on the pixel data arranged as video frames by the processor 102. The signals EVID-A-EVID-N may be presented by each of the camera systems 100*a*-100*n* to the network 70.

The camera 100*a* is shown presenting both the signal EVID-A and the signal MATCH to the network 70. In some embodiments, the signal SCHTXT may be presented to all of the camera systems 100*a*-100*n* and all of the camera systems 100*a*-100*n* may perform the video search in response to the user query. If more than one of the camera systems 100*a*-100*n* detects a match to the visual data in the video frames captured based on the user query, then more than one of the camera systems 100*a*-100*n* may generate the signal MATCH. For example, the image match data may further comprise camera ID information. The camera ID information may comprise data to identify which of the cameras captured the video frame that matches the user input.

The remote computing devices (e.g., the scalable computing service) 204*a*-204*n* may receive the signal MATCH and/or each of the signals EVID-A-EVID-N. The remote computing devices 204*a*-204*n* may be configured to store the encoded video frames received in the signals EVID-A-EVID-N. For example, the remote computing devices 204*a*-204*n* may provide mass storage for video data. The remote computing devices 204*a*-204*n* may extract a number of video frames from the stored encoded video data based on the image match data. For example, the remote computing devices 204*a*-204*n* may generate a decoded video sequence comprising at least the video frame comprising the visual data match to the user input query. Additional frames before and after the matching video frame may be included in the decoded video sequence. The VLM 212 may be configured to analyze the decoded video sequence. For example, a vision encoder implemented by the VLM 212 may generate video-conversational data in response to the decoded video sequence. The VLM 212 may generate a plain language description of the decoded video sequence. In an example a large language model (LLM) implemented by the VLM 212 may generate natural text in response to the video-conversational data. The plain language description may comprise a text description of the visual features of the video frames in the decoded video sequence. The text description of the visual features may comprise behavioral information and/or temporal descriptions of the visual data throughout the decoded video sequence. The VLM 212 may generate the signal OUTPUT. The signal OUTPUT may comprise the plain language description of the decoded video sequence. The signal OUTPUT may comprise the decoded video sequence.

The signal OUTPUT may be communicated by the remote computing devices 204*a*-204*n* to the network 70. The network 70 may present the signal OUTPUT to the user devices 202*a*-202*n*. The user devices 202*a*-202*n* may display the plain language description of the decoded video frames using the companion app 208. The user devices 202*a*-202*n* may be configured to display the video frames of the decoded video sequence.

Figure 5:
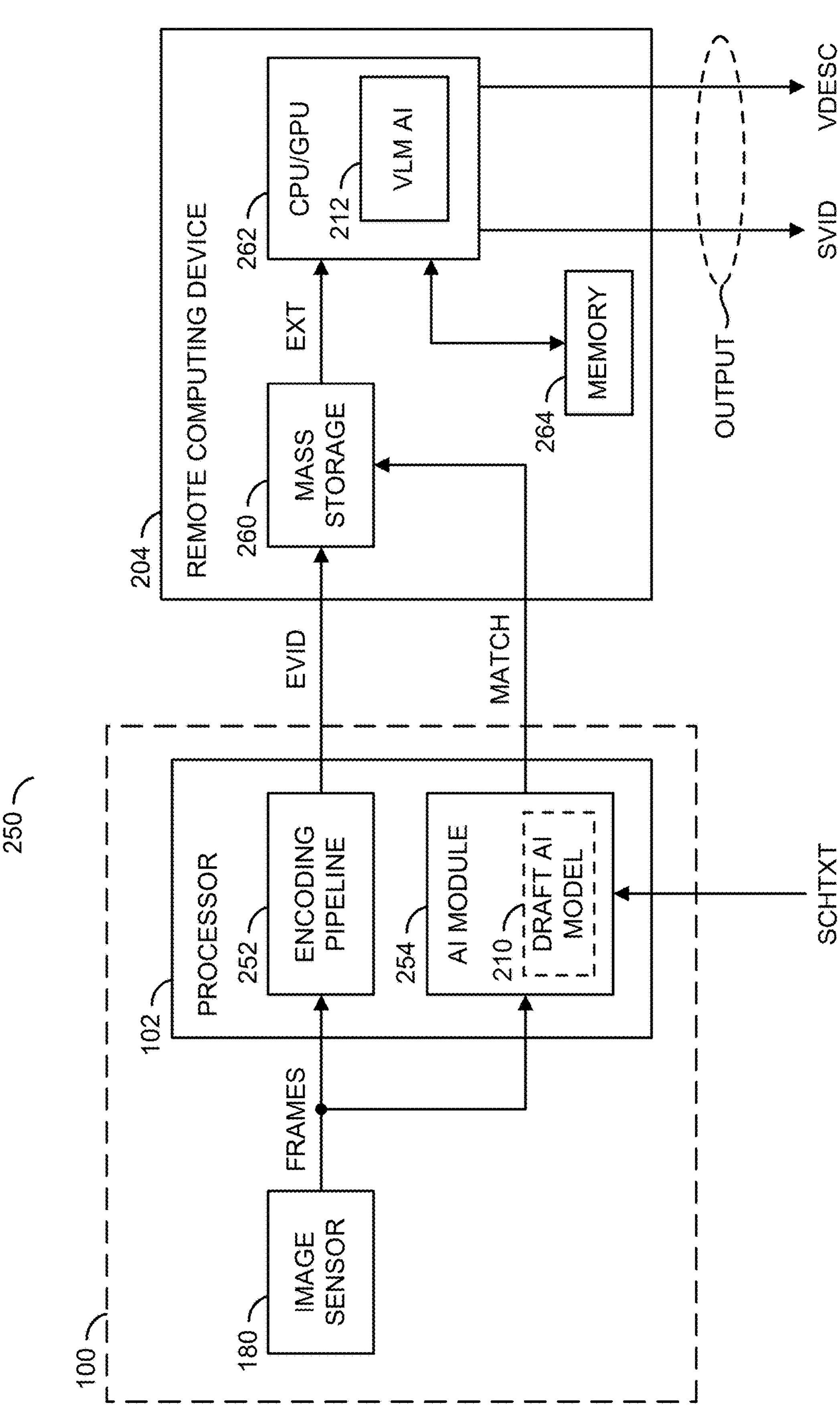
FIG. 5 is a block diagram illustrating a two-stage camera-based video search system.

Referring to FIG. 5, a block diagram illustrating a two-stage camera-based video search system is shown. A system 250 is shown. The system 250 may implement an example embodiment of the two-stage camera-based video search system. The system 250 may comprise the camera system 100 and the remote computing device 204. For example, the camera system 100 may be a representative example of one of the camera systems 100*a*-100*n* and the remote computing device 204 may be a representative example of the remote computing devices 204*a*-204*n*. In an example, the system 250 may be implemented at a single location (e.g., at one property), with the camera system 100 implementing a surveillance camera (e.g., an outdoor security camera, such as a porch camera) and the remote computing device 204 implementing a local AI-box (e.g., a standalone server/computer implemented at the same property for a home surveillance setup).

The camera system 100 may comprise the processor 102 and/or the image sensor 180. The image sensor 180 is shown presenting a signal (e.g., FRAMES) to the processor 102. For example, the capture device 104 may generate the signal FRAMES comprising pixel data and/or video frames and the signal FRAMES may be received by an interface of the processor 102. The interface of the processor 102 may receive the signal SCHTXT. The signal SCHTXT may comprise the natural text input presented by the user devices 202*a*-202*n*. For example, the signal SCHTXT may be the query from an end-user about visual data in the video frames. The interface of the processor 102 may be configured to receive the pixel data of an environment in the signal FRAMES and the user input comprising a natural text description in the signal SCHTXT.

The processor 102 may comprise a block (or circuit) 252 and/or a block (or circuit) 254. The circuit 252 may implement an encoding pipeline. The circuit 254 may implement an artificial intelligence (AI) module. The processor 102 may comprise other components (not shown). For example, the encoding pipeline 252 and/or the AI module may be implemented by one or more of the hardware modules 190*a*-190*n* described in association with FIG. 3. The number, type and/or arrangement of the components of the processor 102 may be varied according to the design criteria of a particular implementation.

The encoding pipeline 252 may be configured to perform video encoding operations. The encoding pipeline 252 may be configured to receive the pixel data arranged as video frames as the video data is generated in real-time. The encoding pipeline 252 may process the pixel data in the signal FRAMES arranged as video frames. The encoding pipeline 252 may be configured to generate encoded video frames. The encoded video frames may be generated in response to the pixel data comprising raw video data. A signal (e.g., EVID) may comprise the encoded video frames. The signal EVID may be a representative example of one of the signals EVID-A-EVID-N shown in association with FIG. 4. The encoding pipeline 252 may generate the signal EVID. The signal EVID may be uploaded from the camera system 100 to the remote computing device 204.

In some embodiments, the encoding pipeline 252 may be configured to perform other video processing operations. For example, the encoding pipeline 252 may perform video preprocessing operations (e.g., color conversion, noise filtering, auto exposure, auto white balance, cropping, image stabilization, rolling shutter correction, etc.). The encoding pipeline 252 may be configured to compress the video data. In one example, the compression performed by the encoding pipeline 252 may be an H.264 encoding. In another example, the compression performed by the encoding pipeline 252 may be an H.265 encoding. In yet another example, the compression performed by the encoding pipeline 252 may be an AV1 encoding. For example, the encoding pipeline 252 may be configured to generate 4K ultra high resolution with H.264 encoding at double real time speed (e.g., 60 fps). In another example, the encoding pipeline 252 may be configured to generate a 4K ultra high resolution with H.265/HEVC at 60 fps and/or 4K AVC encoding (e.g., 4KP30 AVC and HEVC encoding with multi-stream support. The encoding pipeline 252 may be configured to convert a raw, uncompressed video stream into a specific digital format suitable for storage, transmission, and/or playback. The encoding pipeline 252 may be configured to apply a video codec (e.g., H.264, H.265, VP9, AV1, etc.) to compress the video data. The encoding pipeline 252 may be configured to multiplex the compressed video with compressed audio into a container format (e.g. MP4, MKV). The encoding pipeline 252 may be configured to add metadata to the video data (e.g., camera ID, camera make/model, GPS data, resolution, bitrate, framerate, etc.). The encoding operations performed by the encoding pipeline 252 may be varied according to the design criteria of a particular implementation.

The AI module 254 may be an AI engine. The AI module 254 may be configured to implement one or more AI models. In some embodiments, the AI module 254 may be configured to implement a single AI model. The AI module 254 may implement the draft AI model 210. For example, the one or more of the AI models implemented by the AI module 254 may be configured to implement video-to-text analysis and/or sensor data-to-text analysis. The video-to-text analysis may generate a plain text (e.g., natural language that may be human readable) description of the content of the video frames. The sensor data-to-text analysis may generate a plain text description of sensor data captured by the sensors 164 (e.g., in the signal SENS). For example, the one or more of the AI models implemented by the AI module 254 may simultaneously analyze the video data and/or the sensor data to create the text, and also continuously evaluate whether triggers have occurred using the text as the text is created (e.g., in real-time). In some embodiments, the AI module 254 may implement multiple AI models. For example, a text-to-speech AI model may be configured to perform computer vision operations that generates the text description of what has happened and/or what has been detected in the video data. A neural network AI model may be configured to perform computer vision operations (e.g., detect objects and/or recognize feature data in the video frames. In one example, one of the AI models may analyze the generated text (e.g., instead of the video data) to determine whether the visual content of the video frames matches the user input. Analyzing the text instead of the video data for the triggers may provide a less computationally intensive analysis than generating text and then re-analyzing the video for the notification rule criteria. The number and/or types of AI models implemented by the AI module 254 may be varied according to the design criteria and/or may be constrained based on the processing capabilities of the processor 102 and/or the capacity of the memory 150.

The AI module 254 may receive the signal FRAMES. The AI module 254 may receive the raw video data in real-time (e.g., similar to the encoding pipeline 252). The draft AI model 210 implemented by the AI module 254 may perform the AI operations on the video data in the signal FRAMES. The AI module 254 may receive the signal SCHTXT. The draft AI model 210 may parse the natural text description of the user input in the signal SCHTXT (e.g., a query of the visual content of the video data) to determine search parameters. The draft AI model 210 may search the video frames for a match between the search parameters and the video data of the video frames. The draft AI model 210 may detect an image (e.g., a video frame) that matches the search parameters. The draft AI model 210 may generate the image match data of the matching video frame (e.g., a frame ID, a frame number, a timestamp, etc.). The draft AI model 210 may generate the signal MATCH. The signal MATCH may be uploaded from the camera system 100 to the remote computing device 204.

In some embodiments, the draft AI model 210 may a CLIP neural network model. The draft AI model 210 may perform a frame-based search for an image that matches the input text in the signal SCHTXT. The input text (e.g., the user input) may define the features and/or visual content of the image to be searched (e.g., the search parameters). The draft AI model 210 may be configured to classify a scene (e.g., the visual data) in the video frames. The draft AI model 210 may be constrained by the processing capabilities of the edge device 100. For example, the hardware constraints may prevent the draft AI model 210 from performing a deep analysis of the scene. Generally, most of the time in video data (e.g., for surveillance cameras) nothing of interest is occurring. When nothing of interest is occurring, deep analysis of the scene may be unnecessary and/or not provide a benefit. For example, the scene classification performed by the draft AI model 210 may provide a trigger for performing deep analysis of a particular subset of the video frames on demand. The VLM AI model 212 implemented by the remote computing device 204 may be configured to perform the deep analysis of the scene. Implementing the draft AI model 210 to perform the scene classification to provide a trigger for the deep analysis may prevent power waste and/or wasting unnecessary computation cycles on video frames that may be unlikely to comprise anything of interest. For example, a cloud computing service may charge a fee based on computation cycles and/or compute time. Performing deep analysis on demand instead of continuously may reduce fees incurred. The draft AI model 210 may classify particular scenes that match the search parameters and the scenes that match the search parameters may be selected for the deep analysis.

The draft AI model 210 may perform scene classification based on the standard prompts that users may be interested in. For example, a standard prompt may be “is the scene crowded?”, “is there any fighting in the scene?”, “is there a person picking up a delivery?”, etc. The draft AI model 210 may be configured to perform the classification for each scene in the video frames in real-time. For example, the scene classification may be performed by the AI module 254 in parallel and/or substantially in parallel with the encoding operations performed by the encoding pipeline 252. In response to finding a scene that matches the prompt input in the signal SCHTXT, the draft AI model 210 may generate the image match data (e.g., a timestamp). Generally, the draft AI model 210 may respond to prompts that may be used to classify the scenes. In one example, the CLIP model may be used with zero shot training (e.g., the draft AI model 210 may have knowledge of correlation built into the model to enable recognition and/or classification of concepts and/or classes that may not have been explicitly provided as training data and/or without training data specific to an operating environment). Similarly, large language models (LLM) may be used with zero shot training as well. For example, one rationale for zero shot training may be because the LLMs may be trained on much larger data.

The CLIP neural network implemented by the draft AI model 210 may be a neural network configured to provide a bridge between computer vision and natural language processing. The CLIP may be trained on a dataset comprising image-text pairs that may enable an understanding of a semantic relationships between visual and textual data. The CLIP neural network may be a multimodal model that may process both images and text. For example, the processing of both images and text may enable image classification, retrieval, and/or captioning using natural language descriptions. The CLIP neural network may be trained using a contrastive learning approach that enables learning to associate relevant image-text pairs while separating unrelated pairs. The CLIP neural network may perform zero-shot image classification by understanding the meaning of text prompts (e.g., the user input) and matching the text prompts to visual representations, without explicit training on the particular classes. The CLIP neural network may comprise at least two encoders (e.g., an image encoder configured to maps images to a visual embedding, and a text encoder configured to map text to a language embedding). The visual embedding and the language embedding may be projected into a shared space for comparison. The CLIP neural network may be configured to perform zero-shot image classification and retrieval using natural language queries and/or search and rank images based on qualitative concepts.

The draft AI model 210 may be configured to determine a match in real-time in the video frames based on the search parameters in the signal SCHTXT. In one example, the user may provide a prompt to search for a person near a red vehicle. Merely finding a video frame of a person may be insufficient, and merely finding any video with a person near any car may be insufficient. The criteria may be interpreted together based on the relationship between the words and/or the word order to determine a match, for example, only when a red vehicle has a person nearby. The draft AI model 210 may further determine constraints based on the input. For example, the criteria asked for 'a person near my red car'. Based on the usage of 'near my red car' the draft AI model 210 may determine that the video frame(s) with a person walking by a car (e.g., in a region of a parking lot) does not meet the criteria. The method of parsing and/or interpreting the meaning behind the criteria provided may be varied according to the design criteria of a particular implementation. Details of the detection criteria for video-to-text analysis may be described in U.S. patent application Ser. No. 18/210,931, filed on Jun. 16, 2023, appropriate portions of which are incorporated by reference.

The remote computing device 204 may comprise a block (or circuit) 260, a block (or circuit) 262 and/or a block (or circuit) 264. The circuit 260 may comprise mass storage. The circuit 262 may comprise a processing unit. In the example shown, the processing unit 262 may comprise a CPU and/or GPU. The circuit 264 may implement a memory. The remote computing device 204 may comprise other components (not shown). The number, type and/or arrangements of the remote computing device 204 may be varied according to the design criteria of a particular implementation.

The mass storage 260 may implement various types of memory. In an example, the mass storage 260 may generally implement non-volatile memory to provide long-term storage of various data. The mass storage 260 may comprise a combination of various types of memory including, but not limited to, a cache, flash memory, memory card, random access memory (RAM), dynamic RAM (DRAM) memory, hard drives (HDDs), solid state drives (SSDs), etc. The mass storage 260 may be configured to store the encoded video frames generated by the camera system 100. For example, the remote computing device 204 may receive the signal EVID comprising the encoded video frames generated by the encoding pipeline 252. In the example shown in association with FIG. 4, the mass storage 260 may store the encoded video frames from the signal EVID-A-EVID-N (e.g., video data generated by multiple camera systems **100*a*-100*n*). The mass storage 260 may be configured to provide terabytes (TB) of storage, petabytes (PB) of storage, exabytes (EB) of storage, etc. For example, the mass storage 260 may comprise many HHDs and/or SSDs operating together to provide mass storage of video data. The number, type and/or arrangement of the mass storage 260** may be varied according to the design criteria of a particular implementation.

The remote computing device 204 may be configured to receive the signal EVID and/or the signal MATCH. Generally, the signal EVID may be provided continually and/or consistently by the camera system 100 as new video data is captured and the signal MATCH may be provided whenever the draft AI model 210 detects a match to the search parameters in the video data. The signal EVID may be uploaded to the remote computing device 204 in response to the encoding operations by the encoding pipeline 252 and the remote computing device 204 may store the encoded video frames in the mass storage 260. The signal MATCH may be uploaded to the remote computing device 204 in response to the user input and the video frames providing a match. The signal MATCH may be presented to the mass storage 260 and/or the processing unit 262 to enable the remote computing device 204 to search the stored encoded video frames for the video frame that matches the image match data. For example, the image match data may provide information that may be used to identify the matching frame location when stored in the mass storage 260.

The remote computing device 204 may be configured to extract a compressed sequence comprising the identified video frame from the image match data. For example, the remote computing device 204 may locate the video frame in the mass storage 260 that matches the image match data and extract a video sequence from the mass storage 260 that comprises the matching video frame. The mass storage 260 may generate a signal (e.g., EXT). The signal EXT may comprise the extracted video sequence. The signal EXT may be generated in response to the signal MATCH. The signal EXT may be presented to the CPU/GPU 262.

The CPU/GPU 262 may be configured to perform video operations on the extracted video sequence. For example, the video operations may comprise a decoding operation. The CPU/GPU 262 may decode the extracted video sequence of the signal EXT to generate a decoded video sequence. The decoded video sequence may comprise a number of consecutive video frames that comprise at least the video frame that corresponds to the image match data.

The length of the decoded video sequence may be varied according to the design criteria of a particular implementation.

The CPU/GPU 262 may be configured to implement one or more AI models. The CPU/GPU 262 may implement the VLM AI model 212. The VLM AI model 212 may be configured to perform the AI operations on the decoded video sequence. The VLM AI model 212 may be configured to capture time-based and/or behavioral information in the video frames. The VLM AI model 212 may be configured to perform the deep analysis of the video frames in the decoded video sequence. The VLM AI model 212 may leverage a larger training database than the draft AI model 210 to enable greater accuracy in the analysis of the video data and/or to generate a more detailed description of the video frames.

The memory 264 may be configured to provide working memory for the CPU/GPU 262. Generally, the memory 264 may have a similar implementation as the memory 150 implemented by the camera systems 100a-100n. However, the memory 264 implemented by the remote computing device 204 may provide significantly larger capacity. For example, the memory 264 may provide sufficient capacity to enable the AI operations performed by the VLM AI model 212. In one example, the memory 264 may provide terabytes of random access memory. The capacity of the memory 264 and/or the amount of the larger capacity of the memory 264 compared to the memory 150 may be varied according to the design criteria of a particular implementation.

The VLM AI model 212 may be configured to perform the deep analysis of the decoded video sequence without the hardware constraints imposed on the draft AI model 210. For example, the VLM AI model 212 may have access to the processing capabilities of the memory 264 and/or the CPU/GPU 262. The memory 264 may comprise significantly greater storage capacity than the memory 150 of the edge device 100. The CPU/GPU 262 may provide significantly more processing capability and/or have access to a significantly larger power budget than the processor 102 of the edge device 100. For example, to perform the AI operations of the VLM AI model 212, the remote computing device may have access to a powerful GPU and/or a NPU (neural processing unit). Since most of the time there may not be anything of interest to the end user in the video frames (e.g., security footage often comprises mostly footage of a static scene), continuously performing the deep analysis by the VLM AI model 212 may not be beneficial and may waste power and/or computational resources (e.g., a cloud computing service may charge fees based on computation time). By implementing the draft AI model 210 to classify the scenes and generate the image match data, the AI operations performed by the VLM AI model 212 may be limited to the decoded video sequence.

In response to the draft AI model 210 generating the image match data, the VLM AI model 212 may perform the deep analysis of the decoded video sequence to generate detailed output. In one example, for a crowded scene, the VLM AI model 212 may describe how many people are involved and/or the behavior of the people (e.g., whether they are arguing or whether they are having friendly discussions, whether they are causing destruction of property, whether somebody is getting bullied, etc.). The particular details and/or the granularity of the details generated by the deep analysis performed by the VLM AI model 212 may be varied according to the design criteria of a particular implementation.

The VLM AI model 212 may generate the signal OUTPUT. The signal OUTPUT may be presented to the user devices 202a-202n. The signal OUTPUT may comprise at least the natural text description of the decoded video sequence. In some embodiments, the signal OUTPUT may comprise the video sequence that corresponds to the detailed natural text description. For example, the CPU/GPU 262 may be configured to encode the decoded video sequence to a format suitable for the user devices 202a-202n (e.g., the decoded video sequence may be re-encoded based on the display capabilities of the user devices 202a-202n, which may be provided in the signal MATCH). The signal OUTPUT may comprise an image and/or video as well as the detailed natural text description leveraging the behavior information determined by the deep analysis performed by the VLM AI model 212.

The signal OUTPUT may comprise a signal (e.g., SVID) and/or a signal (e.g., VDESC). The signal SVID may comprise the re-encoded version of the video sequence. The signal VDESC may comprise the detailed natural text description generated by the VLM AI model 212. Generally, the draft AI model 210 implemented on the edge device 100 may select an interesting scene (or scenes) and the larger VLM AI model 212 implemented on the remote computing device 204 may be used to find more details about the selected scenes.

Figure 6:
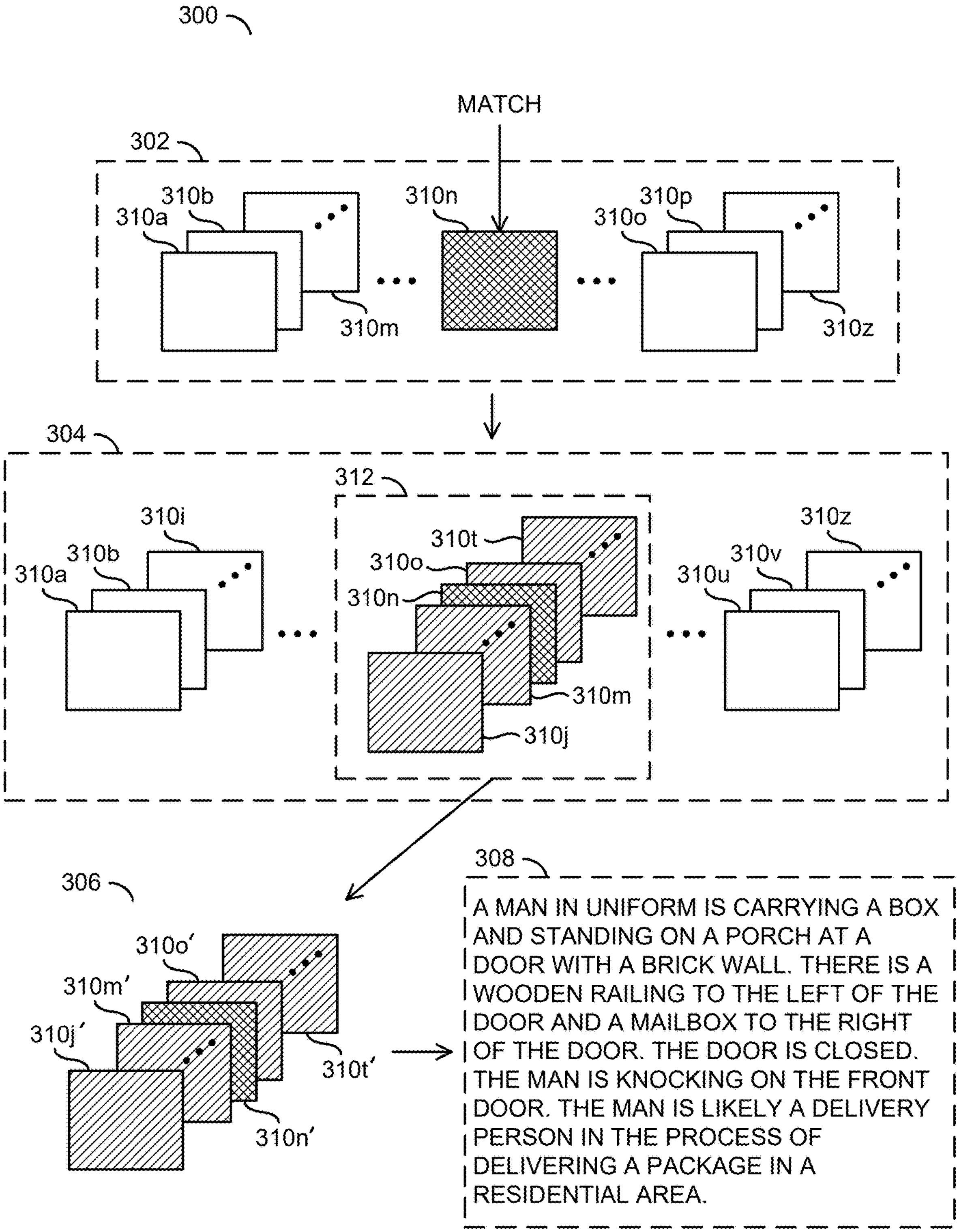
FIG. 6 is a diagram illustrating selecting a video sequence in an encoded video stream.

Referring to FIG. 6, a diagram illustrating selecting a video sequence in an encoded video stream is shown. Deep video analysis 300 is shown. The deep video analysis 300 may be performed at the remote computing device 204. The deep video analysis 300 may comprise an encoded video stream 302, a video sequence extraction 304, a decoded video sequence 306 and/or a detailed natural text description 308.

The encoded video stream 302 may be stored in the mass storage 260 of the remote computing device 204. For example, the encoded video stream 302 may be generated in the encoding pipeline 252 and uploaded as the signal EVID by the camera system 100. The encoded video stream 302 is shown as a representative example of encoded video data stored in the mass storage 260. For example, the mass storage 260 may store encoded video data that comprises multiple different encoded video streams (e.g., encoded video streams from different times captured by the same one of the camera systems 100a-100n and/or encoded video streams received from more than one of the camera systems 100a-100n).

The encoded video stream 302 may comprise a number of encoded video frames 310a-310z. The encoded video frames 310a-310z may comprise pixel data arranged as video frames and encoded to a particular format. In one example, the encoded video frames 310a-310z may be encoded in the H.264 format. In another example, the video frames 310a-310z may be encoded in the H.265 format. In yet another example, the video frames 310a-310z may be encoded in the AV1 format. The size and/or number of the encoded video frames 310a-310z may be determined according to a framerate and/or resolution of the video data generated by the camera system 100. In one example, the encoded video frames 310a-310z may be a 1280×720 resolution at 60 fps. In another example, the encoded video frames 310a-310z may be a 1920×1080 resolution at 60 fps. In yet another example, the encoded video frames 310a-310z may be a 4k resolution at 30 fps. In still another example, the encoded video frames 310a-310z may be an 8k resolution at 30 fps. The encoded video frames 310a-310z may further comprise audio data (e.g., an audio track) and/or metadata (e.g., resolution information, camera ID information, camera make/model information, GPS data, timestamps, etc.). The type, size and/or format of the encoded video frames 310*a*-310*z* in the encoded video stream 302 may be varied according to the design criteria of a particular implementation.

The remote computing device 204 may receive the signal MATCH. The signal MATCH may comprise the image match data generated by the draft AI model 210. The image match data may comprise various types of data that may be used to identify a particular video frame from a particular encoded video stream generated by a particular one of the camera systems 100*a*-100*n*. The remote computing device 204 may search the encoded video stream 302 based on the image match data in the signal MATCH. In the example shown, the encoded video frame 310*n* may be the video frame that corresponds to the image match data in the signal MATCH. For example, the draft AI model 210 may have identified the video frame as matching the query of the user input from the signal SCHTXT and generated image match data to identify the matching video frame after encoding as the encoded video frame 310*n*. In one example, the image match data may comprise a timestamp that may identify a particular one of the encoded video frames 310*a*-310*z*. In another example, the image match data may comprise a frame number that may identify a particular one of the encoded video frames 310*a*-310*z*. In still another example, the image match data may comprise a metadata entry that may identify a particular one of the encoded video frames 310*a*-310*z*. The method of identifying the encoded video frame 310*n* as the matching video frame may be varied according to the design criteria of a particular implementation.

The encoded video stream 302 may comprise the matching encoded video frame 310*n*. The encoded video stream 302 may comprise encoded video frames 310*a*-310*m* generated before the matching encoded video frame 310*n*. The encoded video stream 302 may comprise encoded video frames 310*o*-310*z* generated after the matching encoded video frame 310*n*. The remote computing device 204 may select some of the encoded video frames 310*a*-310*m* from before the matching encoded video frame 310*n* and/or some of the encoded video frames 310*o*-310*z* from after the matching encoded video frame 310*n* for extraction and deep analysis by the full VLM AI 212.

The video sequence extraction 304 is shown comprising the encoded video frames 310*a*-310*z*. A dotted box 312 is shown. The dotted box 312 may comprise the encoded video frames 310*j*-310*t*. The dotted box 312 may represent a video sequence selection. The video sequence selection 312 may comprise at least the matching encoded video frame 310*n* and some of the encoded video frames 310*a*-310*z* generated prior to and/or generated after the matching encoded video frame 310*n*.

As a representative example, the encoded video frames 310*a*-310*i* and the encoded video frames 310*u*-310*z* are shown outside of the video sequence selection 312 and the encoded video frames 310*j*-310*t* may be the encoded video frames within the video sequence selection 312. In the example shown, a subset of the sequence of the encoded video frames 310*a*-310*m* that immediately preceded the matching video frame 310*n* (e.g., the encoded video frames 310*j*-310*m*) and a subset of the sequence of the encoded video frames 310*o*-310*z* that immediately succeeded the matching video frame 310 (e.g., the encoded video frames 310*o*-310*t*) have been selected as part of the selected video sequence 312. In one example, the encoded video frames 310*a*-310*z* that may be included with the matching video frame 310*n* may be a particular number of video frames regardless of the framerate (e.g., the first one thousand encoded video frames before and the first thousand video frames after the matching encoded video frame 310*n*). In another example, the encoded video frames 310*a*-310*z* that may be included with the matching video frame 310*n* may be within a particular time range (e.g., thirty seconds of video before and thirty seconds of video after the matching encoded video frame 310*n*). In still another example, the encoded video frames 310*a*-310*z* that may be included with the matching video frame 310*n* may be a sampling of the encoded video frames 310*a*-310*z* (e.g., a selection of encoded video frames at a lower framerate to provide a sampling of video data for a timelapse sequence before and/or after the matching encoded video frame 310*n*, such as one video frame every second). The number of the encoded video frames 310*a*-310*z* and/or the method of selecting from the encoded video frames 310*a*-310*z* to include with the matching encoded video frame 310*n* in the video sequence selection 312 may be varied according to the design criteria of a particular implementation.

The remote computing device 204 may be configured to decode the encoded video frames 310*j*-310*t* in the video sequence selection 312. The signal EXT may comprise the video sequence selection 312. For example, the mass storage 260 may present the signal EXT to the CPU/GPU 262. The CPU/GPU 262 may be configured to perform decoding operations on the encoded video frames 310*j*-310*t* of the video sequence selection 312. The decoded video sequence 306 may be generated in response to the decoding operations. The decoded video sequence 306 may comprise decoded video frames 310*j*'-310*t*' that correspond to the encoded video frames 310*j*-310*t* of the video sequence selection 312. The decoded video sequence 306 may comprise at least the decoded matching video frame 310*n*'. The decoded video sequence 306 may further comprise the decoded video frames 310*j*'-310*m*' that correspond to the encoded video frames 310*j*-310*m* captured before the matching encoded video frame 310*n* and/or the decoded video frames 310*o*'-310*t*' that correspond to the encoded video frames 310*o*-310*t* captured after the matching encoded video frame 310*n*. The decoded video frames 310*j*'-310*t*' of the decoded video sequence may be in condition to enable the full VLM AI 212 to perform AI operations for the deep analysis.

The VLM AI 212 may be configured to perform the AI operations for the deep analysis of the decoded video sequence 306. The CPU/GPU 262 and/or the memory 264 may provide the computational resources to enable the AI operations for the deep analysis of the decoded video sequence 306 by the VLM AI 212. The VLM AI 212 may perform the deep analysis on each of the decoded video frames 310*j*'-310*t*' of the decoded video sequence 306. For example, once the draft AI model 210 finds a matching scene in response to the user query, the image match data may be sent do the remote computing device 204 and the remote computing device 204 may extract the video sequence selection 312 at the timestamp of the image match data and perform the decoding operations to provide the decoded video sequence 306 as an input to the VLM AI 212. The VLM AI 212 may perform the AI operations for the deep analysis on the subset of the video frames stored in the mass storage 260 based on the image match data (e.g., the deep analysis AI operations may be performed on the decoded video sequence 306 rather than all of the video frames stored). The deep AI analysis by the VLM AI 212 may be configured to analyze the decoded video frames **310*j*'-310*t*' individually and together in order to provide a video-to-text description of the visual data in the decoded video sequence 306**.

The deep analysis AI operations performed by the VLM AI 212 may be configured to determine detailed information about the visual content of the decoded video sequence 306 and/or convert the detailed information into a human readable format. The deep analysis AI operations may comprise detecting behavioral data about objects, animals and/or people detected in the decoded video sequence. The behavioral data may be determined in response to a temporal analysis of the decoded video frames **310*j*'-310*t*'. For example, features of objects, people and/or animals may be tracked over time throughout the decoded video frames 310*j*'-310*t*' to determine contextual information about movement and/or behavior. The temporal analysis may enable the detection of behavior and/or context that may not be able to be determined from an analysis of the decoded matched video frame 310*n*'** alone.

The VLM AI 212 may generate the detailed natural text description 308 in response to the deep analysis AI operations performed on the decoded video sequence 306. The detailed natural text description 308 may be output in the signal VDESC. The signal VDESC may be provided as output along with the video frames used to determine the detailed natural text description 308. For example, the CPU/GPU 262 may be configured to re-encode the decoded video sequence 306 and present the re-encoded video frames as the signal SVID along with the signal VDESC.

The detailed natural text description 308 may be generated in response to the video-to-text analysis performed by the VLM AI 212. For example, the detailed natural text description 308 may describe the video contents with sufficient detail that the source video frames may no longer be necessary to understand the video contents. For example, the detailed natural text description 308 may provide a human readable description of the contents of the decoded video sequence 306 with sufficient detail to enable the visually impaired to understand the contents of the video frames (e.g., using a screen reader). The detailed natural text description 308 may further comprise content acquired from metadata and/or audio content of the decoded video sequence 306. For example, the detailed natural text description 308 may describe the details of the scene with respect to the information in the query submitted by the end user (e.g., if the query was about detecting a burglar, the detailed natural text description 308 may provide what the burglar is wearing, where the burglar is looking, what the burglar is doing with his hands, whether the burglar attempted to jiggle the doorknob of the home, how long the burglar was at the front door, etc.).

In the example shown, the detailed natural text description 308 may correspond to the detection of a package delivery. As an example, the detailed natural text description 308 may comprise the text of: "A man in uniform is carrying a box and standing on a porch at a door with a brick wall. There is a wooden railing to the left of the door and a mailbox to the right of the door. The door is closed. The man is knocking on the front door. The man is likely a delivery person in the process of delivering a package in a residential area". The amount of detail provided in the detailed natural text description 308 may be a user-provided parameter. In some embodiments, the detailed natural text description 308 may be limited to a particular number of words (e.g., 50 words or less). In some embodiments, the detailed natural text description 308 may comprise full sentences. In some embodiments, the detailed natural text description 308 may comprise a number of bullet points. In some embodiments, the detailed natural text description 308 may be humorous. The type of text generated for the detailed natural text description 308 may be varied according to the design criteria of a particular implementation.

Figure 7:
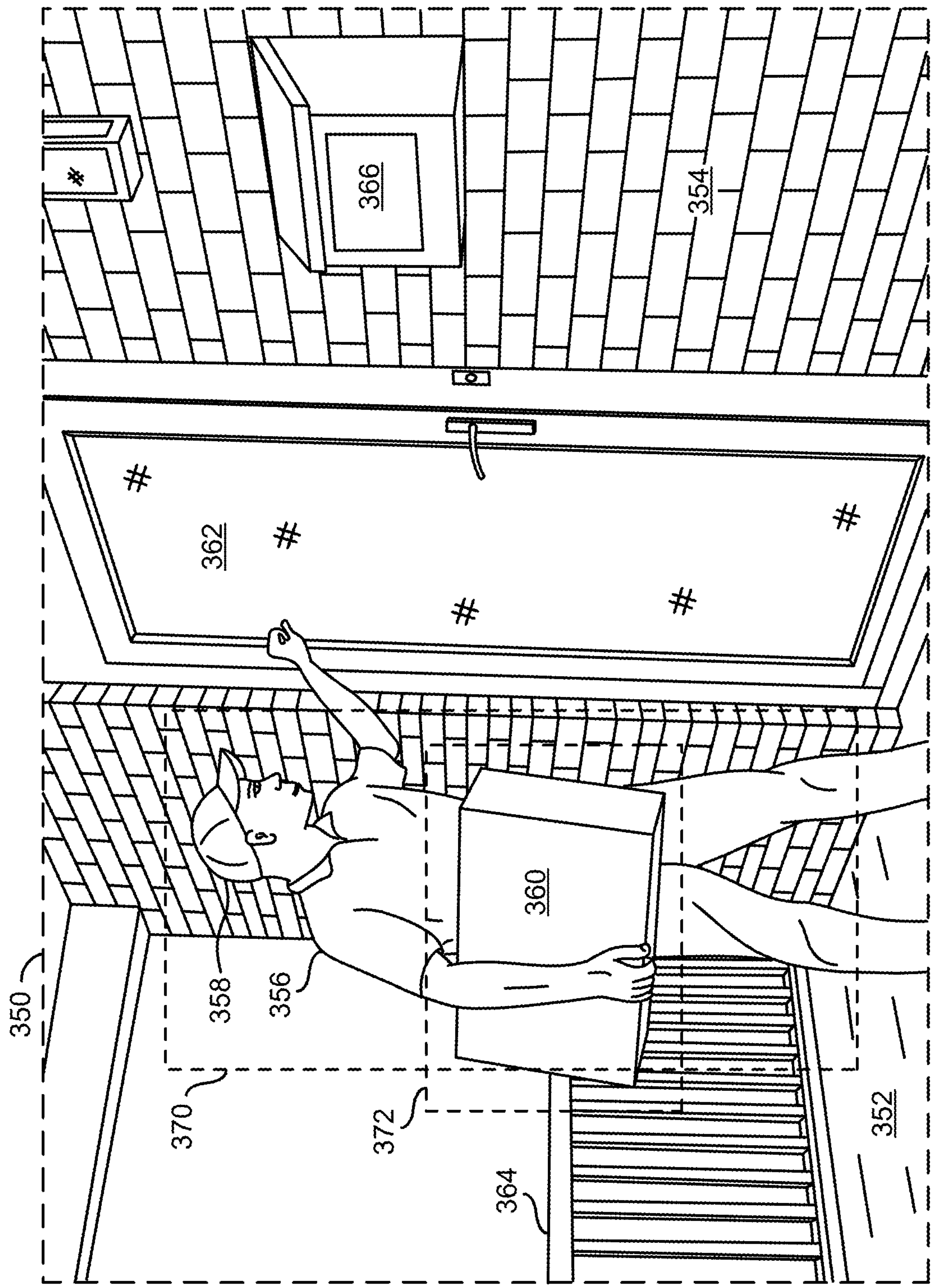
FIG. 7 is a diagram illustrating performing AI operations on a video frame captured by an edge device.

Referring to FIG. 7, a diagram illustrating performing AI operations on a video frame captured by an edge device is shown. An example video frame 350 is shown. The example video frame 350 may be a video frame that matches the user query. For example, the example video frame 350 may be a video frame that may be the encoded matching video frame **310*n* and/or the decoded matching video frame 310*n*'. Generally, the video frame 350 may be one of the raw video frames in the signal FRAMES that may be encoded by the encoding pipeline 252 and/or analyzed by the draft AI model 210 (e.g., before being communicated to the remote computing device 204) and then stored in the mass storage 260 (e.g., after being communicated to the remote computing device 204). For simplicity, the example video frame 350 may be used as a sample video frame for describing the AI operations performed by the draft AI model 210 and/or the VLM AI 212**

The video frame 350 may be a representative example of the video data generated by the video processing pipeline of the processor 102 for encoding by the encoding pipeline 252 and/or analysis by the draft AI model 210. The video frame 350 may be analyzed by the draft AI model 210 to find a match to the user input query in the signal SCHTXT. After analysis by the draft AI model 210, the video frame 350 may be analyzed by the VLM AI model 212 to generate the detailed natural text description 308 in response to the deep analysis of the video frame 350.

The video data (or visual content) of the video frame 350 is shown as a representative example of video data captured from the camera system 100. While the video frame 350 is shown as human viewable visual content for illustrative purposes, the draft AI model 210 and/or the VLM AI model 212 may perform various operations on the pixel data and/or image blocks of the video frame 350. The video data of the video frame 350 may comprise a porch 352, a brick wall 354, a person 356, a uniform 358, a package 360, a door 362, a wooden railing 364 and/or mailbox 366 captured in the field of view of the camera system 100. The person 356 is shown wearing the uniform 358 and on the porch 352 while holding the package 360 and knocking on the front door 362.

Dotted shapes 370-372 are shown in the video frame 350. The dotted shapes 370-372 may represent the detection and/or classification of an object/subject by the computer vision operations performed by the processor 102, the draft AI model 210 and/or the VLM AI 212. The dotted shapes 370-372 may comprise the pixel data corresponding to an object detected by the computer vision operations pipeline, the neural network model **190*b*, the draft AI model 210 and/or the VLM AI 212. In one example, the dotted shapes 370-372 may comprise a classification of the visual data in the video frame 350 in response to the search parameters determined from the user input query. In the example shown, dotted shape 370 may correspond to the person 356 in the uniform 358 and the dotted shape 372 may correspond to the package 360. For example, if the user input query provided search parameters for a package delivery, the dotted shape 370 may be a classification of the person 356 as a delivery person and the dotted shape 372 may be a classification of the package 360 as a package for delivery by the draft AI model 210**.

In some embodiments, the objects may be detected in response to animal detection, household object detection, interior object detection, person detection, vehicle detection, roadway detection, sky region detection, obstacle detection and/or exterior object detection (e.g., one or more of the neural network 190*b*, the draft AI model 210 and/or the VLM AI 212 may comprise libraries configured to detect people, vehicles, objects, animals, etc.). The dotted shapes 370-372 are shown for illustrative purposes. In an example, the dotted shapes 370-372 may be a visual representation of the object detection and/or scene classification (e.g., the dotted shapes 370-372 may not appear on an output video frame in the signal OUTPUT). In another example, the dotted shapes 370-372 may be a bounding box generated by the processor 102 displayed on the output video frames to indicate that an object has been detected and/or classification (e.g., the bounding boxes 370-372 may be displayed in a debug mode of operation).

The computer vision operations, the scene classification, the video-to-text operations and/or the deep AI analysis may be configured to detect characteristics of the visual content of the scene, characteristics of the detected objects, behavior of the objects detected, a movement direction of the objects detected, a context of the objects detected and/or a liveness of the objects detected. The characteristics of the objects and/or visual content may comprise a height, length, width, slope, an arc length, a color, a color temperature, an amount of light emitted, detected text on the object, a path of movement, a speed of movement, a direction of movement, a proximity to other objects, etc. The characteristics of the detected object may comprise a status of the object (e.g., opened, closed, on, off, etc.). The characteristics of the detected object and/or the visual content may comprise a distance measurement from the lens 160 to the detected object. The behavior and/or liveness may be determined in response to the type of object and/or the characteristics of the objects detected. In some embodiments, the scene classification performed by the draft AI model 210 may be determined on an individual frame in real-time (e.g., on a frame-by-frame basis). While one example video frame 350 is shown, the behavior, movement direction and/or liveness of an object and/or the visual content of the scene for the deep analysis AI operations performed by the VLM AI 212 may be determined by analyzing a sequence of video frames captured over time in the decoded video sequence 306. For example, a path of movement and/or speed of movement characteristic may be used to determine that an object classified as a person may be walking or running. The types of characteristics and/or behaviors detected may be varied according to the design criteria of a particular implementation.

In the example shown, the classification boxes 370-372 may be examples of details in the visual content of the video frame 350 used by the draft AI model 210 to classify the scene. In one example, the classification box 370 may represent one or more types of classifications (e.g., an intruder detection, a visitor detection, a person detection, a package delivery detection, etc.). In one example, the classification box 372 may represent one or more types of classifications (e.g., a package delivery, a package theft, a package detection, etc.). For example, the draft AI model 210 may classify the video frame 350 for multiple different user input queries (e.g., a theft, a delivery, an intruder, etc.). While the classification boxes 370-372 are shown as example portions of the video frame 350 used for scene classification, the draft AI model 210 may perform the classification of the scene with respect to the user input query based on the visual content of the entire video frame. The classification boxes 370-372 are shown as representative examples of two objects that may provide evidence for a classification but, generally, many more objects and/or visual content may be used to determine the scene classification (e.g., the uniform 358, the door 362, the mailbox 366, etc.).

The processor 102, the CNN module 190*b*, the draft AI model 210 and/or the VLM AI 212 may be configured to implement region, animal, object and/or face detection techniques. In some embodiments, other types of subjects as objects of interest may be detected (e.g., vehicles, passengers, pedestrians, street signs, etc.). The computer vision techniques, the scene classification techniques and/or the video-to-text techniques may be configured to detect the regions of interest (ROIs) of the visual content and/or generate the information about the detected object and/or the context of the scene generally. For example, the bounding boxes 370-372 may be a visual representation of the ROIs detected. The computer vision technique may be looped (e.g., to iteratively perform object/subject detection throughout the example video frame 350) in order to determine if any objects of interest (e.g., as defined by the feature set) are within the field of view of the lens 160 and/or the image sensor 180.

While only the classification boxes 370-372 are shown as representative examples of objects of interest, the computer vision operations, the scene classification and/or the video-to-text operations performed by the processor 102, the CNN module 190*b*, the draft AI model 210 and/or the VLM AI 212 may be configured to detect background objects and/or other types of objects. The background objects may be detected for other computer vision purposes (e.g., training data, labeling, depth detection, etc.). The type(s) of subjects and/or visual content identified as the objects of interest may be varied according to the design criteria of a particular implementation.

The draft AI model 210 may perform the AI operations on the video frames in real-time based on the search parameters. The search parameters may be determined by the draft AI model 210 in response to parsing the natural text input query provided by the end user (e.g., input from the user devices 202*a*-202*n*). In the example shown, the user input query may comprise a request of "Can you show me when a package is delivered?". The draft AI model 210 may parse the words of the user input request (e.g., analyzing each word individually and together for context) to determine the search parameters to use to classify the video frames. In one example, the search parameters may correspond to detecting features of a delivery person (e.g., a person in uniform, a person carrying a package, a person leaving a receipt, etc.) and/or a package (e.g., a box, a branded bag, an item with a shipping sticker, etc.). The draft AI model 210 may perform the classifications 370-372 that may correspond to the search parameters. In response to the classifications, the draft AI model 210 may generate the image match data. The image match data may comprise information configured to enable an identification of the video frame 350 in the encoded video stream 302 and/or information about the classifications made (e.g., which query that the image match data corresponds to, in the scenario where the user has run multiple queries).

The VLM AI 212 may analyze the video frame 350 (along with the other video frames in the decoded video sequence 306) to generate the smart metadata that may describe the contents of the video data. The VLM AI 212 analysis performed on the video frame 350 may comprise a deep analysis. The smart metadata generated in response to the deep AI analysis may comprise the detailed natural text description 308. While the video frame 350 is shown as the matching video frame, the deep AI analysis may be performed on a group (or sequence) of video frames in the decoded video sequence 306.

The detailed natural text description 308 that describes the contents of the video frames may be stored in the mass storage 260. In some embodiments, the detailed natural text description 308 may be used for other purposes (e.g., users may run other queries that may search the detailed natural detailed description 308 for matches, statistical data, such as the timings of multiple package deliveries may be generated based on analyzing multiple different detailed natural text descriptions, etc.). For example, the stored detailed natural text descriptions may be searched instead of analyzing the video data directly, which may be more computationally efficient.

The detailed natural text description 308 shown in association with FIG. 6 may be an example description performed for the package delivery shown in the video frame 350. For example, the text "A man in uniform is carrying a box and standing on a porch at a door with a brick wall" may correspond to the person wearing the uniform 358 standing on the porch 352 and carrying the package 360, the brick wall 354 and the door 362. The text "There is a wooden railing to the left of the door and a mailbox to the right of the door" may correspond to the wooden railing 364 and the mailbox 366 relative to the door 362. The text, "The door is closed" may correspond to the status of the door 362. The text, "The man is knocking on the front door" may correspond to the behavior of the person 356 and the door 362. The text, "The man is likely a delivery person in the process of delivering a package in a residential area" may correspond to the behavior of the man 356 and the package 360 determined based on the temporal analysis (e.g., what the man does, where the package ends up after the man leaves, etc.) and/or the overall visual content of the video frames (e.g., the porch 352 and the mailbox 366 may be indicative of a residential area). Generally, more data and/or data comprising granular details may be generated for the detailed natural text description 308. The detailed natural text description 308 may further comprise information about the camera ID and/or location (e.g., text such as, "the video was captured from the camera labeled FRONT PORCH"), a frame number and/or a timestamp (e.g., text such as, "the video was captured at 12:32 pm on Monday, June 6"), a property address (e.g., text such as, "the video was captured by one of the cameras located at 123 Main St."), etc. For example, the detailed natural text description 308 is shown with a relatively small amount of text for illustrative purposes, while the actual text description generated by the VLM AI 212 may comprise a detailed description of the video content of the decoded video sequence 306. Details of smart metadata and/or natural text descriptions of video may be described in association with U.S. patent application Ser. No. 18/210,931, filed on Jun. 16, 2023, appropriate portions of which are incorporated by reference.

Figure 8:
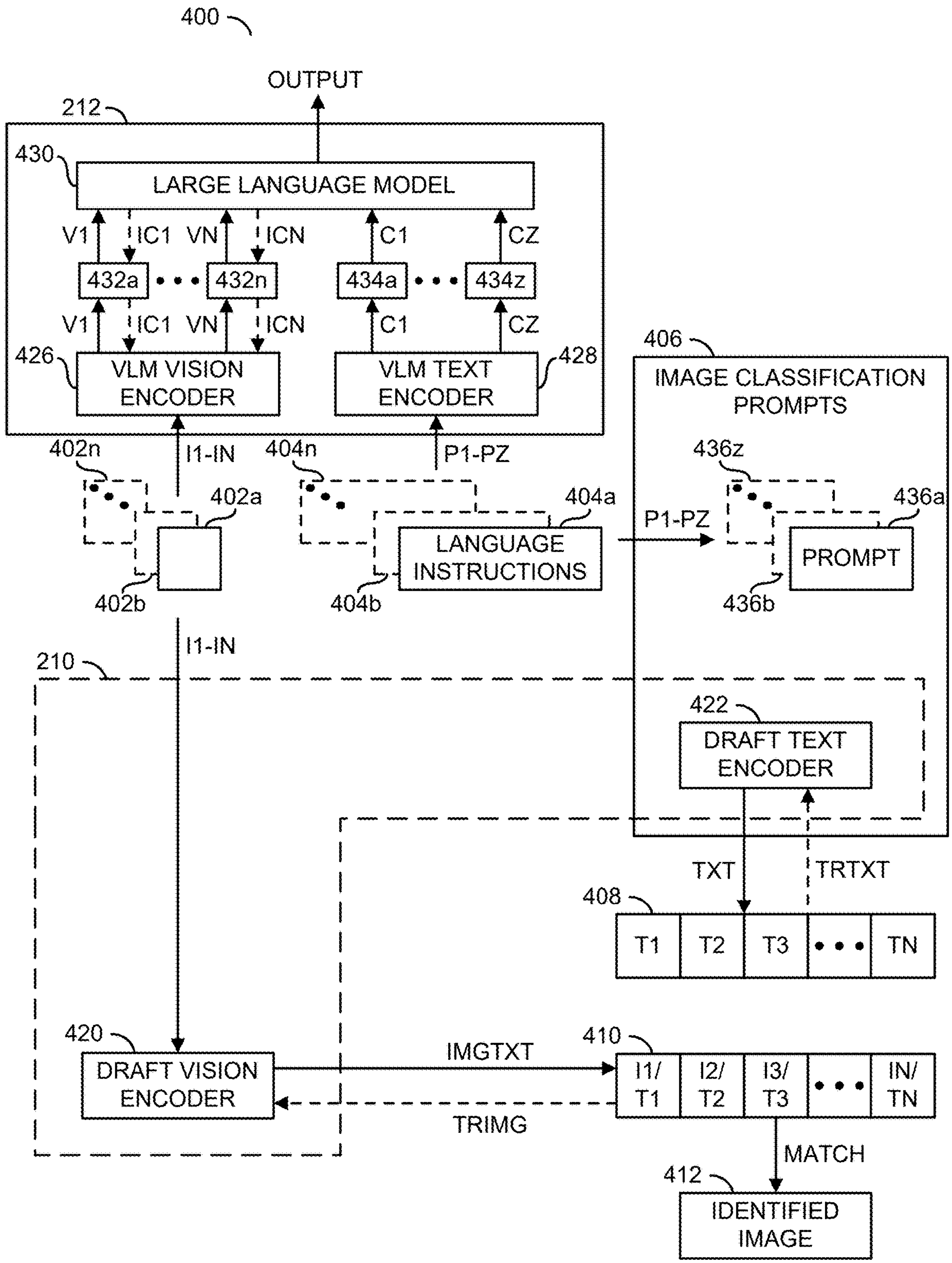
FIG. 8 is a block diagram illustrating aligned training data for a draft AI model and a full VLM AI model.

Referring to FIG. 8, a block diagram illustrating aligned training data for a draft AI model and a full VLM AI model is shown. Training data alignment 400 is shown. The training data alignment 400 may comprise the draft AI model 210, the full VLM AI model 212, a number of input images 402*a*-402*n*, a number of language instructions 404*a*-404*n*, a block 406, a block 408, a block 410 and/or a block 412. The input images 402*a*-402*n* may comprise video frames. In some embodiments, the input images 402*a*-402*n* may comprise user input, video frames generated by the processor 102 and/or training data. The language instructions 404*a*-404*n* may comprise conversational data. In some embodiments, the language instructions 404*a*-404*n* may comprise user input and/or training data. The block 406 may implement image classification prompts. The block 408 may implement text data. The block 410 may implement image/text data. The block 412 may be an identified image. The training data alignment 400 may comprise other components (not shown). The number, type and/or arrangement of components and/or data for implementing the training data alignment 400 may be varied according to the design criteria of a particular implementation.

The input images 402*a*-402*n* may comprise image data provided as input to the draft AI model 210 and/or the full VLM 212. In some embodiments, the input images 402*a*-402*n* may comprise training data. In some embodiments, the input images 402*a*-402*n* may comprise the signal FRAMES generated by the image sensor 180. In some embodiments, the input images 402*a*-402*n* may comprise the decoded video sequence 306.

The language instructions 404*a*-404*n* may comprise text input to the draft AI model 210 and/or the full VLM 212. In some embodiments, the language instructions 404*a*-404*n* may comprise prompt input. In some embodiments, the prompt input for the language instructions 404*a*-404*n* may comprise training data. In some embodiments, the prompt input for the language instructions 404*a*-404*n* may comprise the user input signal SCHTXT.

The text data 408 may comprise descriptive text T1-TN. For example, different descriptive text T1-TN may be capable of describing a similar prompt and/or image (e.g., different language may ask the same question and/or different language may describe the same scene). The text data 408 may comprise a numerical representation and/or embedding of the prompt input. The image/text data 410 may comprise image/text pairs I1/T1-IN/TN. The image/text pairs I1/T1-IN/TN may correlate particular images with descriptive text. The identified image 412 may be an image (or video frame) that matches the prompt provided in the signal SCHTXT.

The draft AI model 210 may comprise a block (or circuit) 420 and/or a block (or circuit) 422. The circuit 420 may implement a draft vision encoder. The circuit 422 may implement a draft text encoder. The draft AI model 210 may comprise other components (not shown). The circuit 420 and/or the circuit 422 may be implemented by one or more dedicated hardware modules (e.g., the hardware modules 190*a*-190*n*) of the processor 102. The number, type and/or arrangement of the components of the draft AI model 210 may be varied according to a design criteria of a particular implementation.

The draft vision encoder 420 may be configured to process images. The draft vision encoder 420 may be configured to receive signals (e.g., I1-IN). The signals I1-IN may comprise the pixel data of the input images 402*a*-402*n*. The draft vision encoder 420 may be configured to map the input images 402*a*-402*n* to a shared latent space with a mapping performed by the draft text encoder 422. In one example, the draft vision encoder 420 may implement a Vision Transformers (ViT) architecture. In another example, the draft vision encoder 420 may implement a CNN architecture. The type of architecture implemented by the draft vision encoder 420 may be varied according to the design criteria of a particular implementation.

The draft vision encoder 420 may be configured to extract features from the signals I1-IN. The draft vision encoder 420 may output a signal (e.g., IMGTXT). The signal IMGTXT may comprise image/text pairs. For example, the signal IMGTXT may comprise the data for the image/text data 410. The draft vision encoder 420 may be configured to receive image/text pairs as training data. The draft vision encoder 420 may be configured to receive a signal (e.g., TRIMG). The signal TRIMG may comprise the image/text data 410 as training data input.

The draft text encoder 422 may be configured to process textual descriptions. The draft text encoder 422 may be configured to convert text input into a numerical representation and/or embedding of the prompt input. The draft text encoder 422 may be configured to map text input to a shared latent space with a mapping performed by the draft vision encoder 420. The draft text encoder 422 may implement a transformer-based architecture.

The draft text encoder 422 may be configured to encode the semantic meaning of text. The draft text encoder 422 may be configured to generate a signal (e.g., TXT). The signal TXT may comprise converted numerical output from text. For example, the signal TXT may comprise data for the text data 408. The draft text encoder 422 may be configured to receive text input as training data. The draft text encoder 422 may be configured to receive a signal (e.g. TRTXT). The signal TRTXT may comprise text data 408 as training data input.

The draft vision encoder 420 may be configured to map the image/text pair output to a shared latent space with the output of the draft text encoder 422. The draft text encoder 422 may be configured to map the text data output to the shared latent space with the output of the draft vision encoder 420. The draft AI model 210 maybe configured to compare and relate images and text in the shared latent space. For example, the draft AI model 210 may receive the signal FRAMES and perform real-time analysis based on the input images in the signal FRAMES and the text input provided by the end-user in the signal SCHTXT. The draft AI model 210 may generate the image/text pair data in the signal IMGTXT. The draft AI model 210 may determine which of the image/text pairs matches the input text SCHTXT and generate the signal MATCH (e.g., the identified image 412).

The full VLM 212 may comprise a block (or circuit) 426, a block (or circuit) 428, a block (or circuit) 430, blocks (or circuits) **432*a*-432*n* and/or blocks (or circuits) 434*a*-434*n*. The circuit 426 may implement a VLM vision encoder. The circuit 428 may implement a VLM text encoder. The circuit 430 may implement a large language model (LLM). The blocks 432*a*-432*n* may comprise image-conversational data. The blocks 434*a*-434*n* may comprise text data. The VLM vision encoder 426, the VLM text encoder 428 and/or the LLM 430 may be implemented by a combination of the CPU/GPU 262 and/or the memory 264 of the remote computing device 204. The full VLM 212 may comprise other components (not shown). The number, type and/or arrangement of the components of the full VLM 212** may be varied according to the design criteria of a particular implementation.

The VLM vision encoder 426 and/or the VLM text encoder 428 may have similar implementations as the respective draft vision encoder 420 and/or the draft text encoder 422. The VLM vision encoder 426 may be a variant of the draft vision encoder 420. The VLM vision encoder 426 may be configured to receive the signals I1-IN comprising the input images **402*a*-402*n*. The VLM text encoder 428 may be configured to receive signals (e.g., P1-PZ) comprising the language instructions 404*a*-404*n***.

In one example, the draft vision encoder 420 and/or the VLM vision encoder 426 may provide bootstrapping language-image pre-training with frozen image encoders and large language models (e.g., BLIP-2). The draft vision encoder 420 and/or the VLM vision encoder 426 may be implemented based on a generic and efficient pre-training strategy that bootstraps vision-language pre-training from off-the-shelf, frozen, pre-trained image encoders and frozen large language models. The draft vision encoder 420 and/or the VLM vision encoder 426 may comprise a querying transformer pre-trained with a first stage that bootstraps vision-language representation learning from a frozen image encoder and a second stage that bootstraps vision-to-language generative learning from a frozen language model. In another example, the draft vision encoder 420 and/or the VLM vision encoder 426 may be implemented based on a Flamingo80B model. The draft vision encoder 420 and/or the VLM vision encoder 426 may be configured with emerging capabilities of zero-shot image-to-text generation that may follow natural language instructions. Details of the draft AI model 210 and/or the full VLM 212 may be described in U.S. patent application Ser. No. 18/210,931, filed on Jun. 16, 2023, appropriate portions of which are incorporated by reference. The type of AI model implemented for video-to-text may be varied according to the design criteria of a particular implementation.

The VLM vision encoder 426 may generate the image-conversational data **432*a*-432*n*. The VLM vision encoder 426 may be configured to receive the image-conversational data 432*a*-432*n* as training data. In one example, the VLM vision encoder 426 may generate signals (e.g., V1-VN) in response to the signals I1-IN comprising the input images 402*a*-402*n*. For example, the VLM vision encoder 426 may generate the image-conversational data 432*a*-432*n* based on the decoded video sequence 306. In another example, the VLM vision encoder 426 may receive signals (e.g., IC1-ICN). The signals IC1-ICN may comprise image-conversational data generated by the LLM 430**. The signals IC1-ICN may comprise training data input.

The VLM text encoder 428 may be configured to generate signals (e.g., C1-CZ). The signals C1-CZ may comprise encoded text generated in response to the language instructions **404*a*-404*n* provided by the signals P1-PZ. The signals C1-CZ may comprise the encoded text data 434*a*-434*z*. The encoded text data 434*a*-434*z* may comprise input for the LLM 430. For example, the encoded text data 434*a*-434*z* may comprise a vector representation of the prompts in the language instructions 404*a*-404*n* extracted by the VLM text encoder 428**.

The full VLM 212 may be larger and/or more powerful than the draft AI model 210. In one example, the draft AI model 210 may have approximately 100 million or fewer parameters. Generally, the full VLM 212 may comprise approximately between 7 billion and hundreds of billions of parameters. For example, more parameters may increase a capacity of the AI models (e.g., bigger models, in terms of number of parameters, may produce more accurate results). However, bigger models involve more computations than smaller models. Bigger models, such as the full VLM 212 may also use a bigger context for processing and more computations for better results. In one example, even a smaller implementation of the full VLM 212 (e.g., approximately 7 billion parameters) may involve a hundred times more computations than the draft AI model 210. The relative size and/or the relative number of calculations of the draft AI model 210 and the full VLM 212 may be varied according to the design criteria of a particular implementation.

The LLM 430 may be configured to generate the signal OUTPUT. The signal OUTPUT may comprise the natural language description 308. The natural language description 308 may be generated in response to the signals V1-VN and/or the signals C1-CZ. For example, the LLM 430 may determine the prompt from the end user (e.g., the signal SCHTXT) providing the query based on the encoded text data 434*a*-434*z* generated by the VLM text encoder 428. The LLM 430 may receive the image-conversational data 432*a*-432*n* describing the decoded video sequence 306 generated by the VLM vision encoder 426. The LLM 430 may be configured to provide the signals IC1-ICN to the VLM vision encoder 426. The signals IC1-ICN may comprise input training data for the VLM vision encoder 426. For example, when training the VLM vision encoder 426, the input images 402*a*-402*n* may be paired with the image-conversational data in the signals IC1-ICN provided by the LLM 430.

The LLM 430 may enable a user experience that provides a conversational interaction, where the VLM AI 212 provides video results, answers to queries and/or notifications as answers in response to the input provided. For example, the LLM 430 may be configured to analyze each word input in the signal SCHTXT (e.g., provided as part of the match data in the signal MATCH) individually and/or together based on the order, arrangement and/or context of the input provided. The parsed information generated may comprise more than merely a keyword. In one example, if the query provided comprises "Show me the last video where someone was near my car for at least 30 seconds", then the LLM 430 may be configured to determine that the context for the match data may be a person near the car for 30 seconds or more. The LLM 430 may generate the natural text description 308 based on the context of the decoded video sequence 306. The context may be provided in the match data.

The full VLM 212 may be configured to perform an analysis of the video data and generate the natural language output 308. The natural language output 308 may be presented in the signal OUTPUT. The LLM 430 may be configured to generate the natural language output 308 by performing natural language processing and generate natural language text based on learned patterns and/or relationships between words in a particular spoken/written human language. The natural language output 308 may comprise a full text description of the decoded video sequence 306. The natural language output 308 may comprise a plain language description of the objects in the video frames, the context of the video frames, the colors in the video frames, the arrangement of the visual elements in the video frames, the behavior of objects in the video frames, the location of objects in the video frames, the types of objects in the video frames, etc.

The natural language output 308 may be determined based on not only a current video frame (e.g., the matching decoded video frame 310*n*'), but also previous decoded video frames 310*j*'-310*m*' and later decoded video frames 310*o*'-310*t*'. For example, a single video frame of an object (e.g., a hand) in the air may not provide sufficient information to determine a location and/or behavior of the object. Analyzing the previous and later video frames may provide context to enable the full VLM 212 to determine behavior such as whether the object in the air is being raised up or falling down. In some embodiments, the natural language description 308 may provide an initial description (e.g., a best guess) based on the content of the current and previous video frames to provide real-time analysis, and then update the natural language description 308 as subsequent video frames are analyzed to update the initial description after more context becomes available (e.g., the initial description may describe an object as lifting up, but after subsequent video frames are analyzed, the object may be determined to be falling down). The full VLM 212 may be configured to determine behaviors of objects in the video frames analyzed. For example, the behavior may comprise a classification of movements of a person and/or a location of the objects (e.g., a vehicle) in response to various objects, behaviors and/or patterns detected. The method of describing the contents of the video data may be varied according to the design criteria of a particular implementation.

The image classification prompts may comprise blocks 436*a*-436*z*. The prompts 436*a*-436*z* may comprise input for the draft text encoder 422 and/or the VLM text encoder 428. The prompts 436*a*-436*z* may comprise several prompts for classification on the camera systems 100*a*-100*n*. For example, a doorbell camera implementing the draft AI model 210 may comprise one or more of the prompts 436*a*-436*z*. Generally, there may be no benefit to additional training for the prompts 436*a*-436*z* for the full VLM 212. However, in order to generate results, there may be fine tuning to the full VLM 212 to adapt to a particular situation and/or environment. For example, for traffic cameras there may be a particular type of scene and for a warehouse security camera, there may be a different type of scene. In an example, the draft AI model 210 implemented in a doorbell camera (e.g., edge device) may detect the package 360, but the full VLM 212 may describe the package 360 better (e.g., how many boxes, how big, color, etc.).

Generally, the draft AI model 210 (e.g., for example a CLIP model) may be trained on a large number of the image and text pairs I1/T1-IN/TN. After training the draft vision encoder 420, the draft AI model 210 may learn the correlation between images and text. Learning the correlation between images and text may enable a classification of images even for new text prompts (e.g., prompts comprising information not explicitly provided in the training data).

The training data alignment 400 may align image-text pairs that may be used for training the draft AI model 210 with image-conversational data. Part of the full VLM 212 may comprise training only the VLM vision encoder 426 to align conversational data that may be input to the VLM text encoder 428. For example, for the same one of the input images 402*a*-402*n*, there may be multiple conversational data generated. For example, for the same image one conversational data may be describing the scene, another may be describing the location of each object, another may be describing a size of each object, etc.

The training data alignment 400 may enable joint training of the draft AI model 210 and video projection performed by the VLM vision encoder 426. For video projection fine tuning for the VLM vision encoder 426, image and text pairs may be used. The same data (e.g., the input images 402*a*-402*n*) may be used to fine tune the draft AI model 210. The image classification prompts 406 may be configured to map the text to the prompts 436*a*-436*z* used for classification in the draft AI model 210.

The training data alignment 400 may enable fine tuning for a task specific scenario (e.g., traffic monitoring, warehouse monitoring, doorbell camera, etc.). The fine tuning may use a smaller dataset of the input images 402*a*-402*n* to train the draft vision encoder 420 and/or the video projection (e.g., the VLM vision encoder 426). The LLM 430 may not be updated, but may retain knowledge learned from previous training based on a large dataset. The training data alignment 400 may comprise training the draft AI model 210. Once the draft AI model 210 is trained, the image-conversational data

432*a*-432*n* used to train the VLM vision encoder 426 may be mapped to image-prompt data in the image classification prompts 406. The prompts 436*a*-436*z* may be used for real-time classification in the draft AI model 210. The draft AI model 210 may be fine tuned with the image-prompt data.

Figure 9:
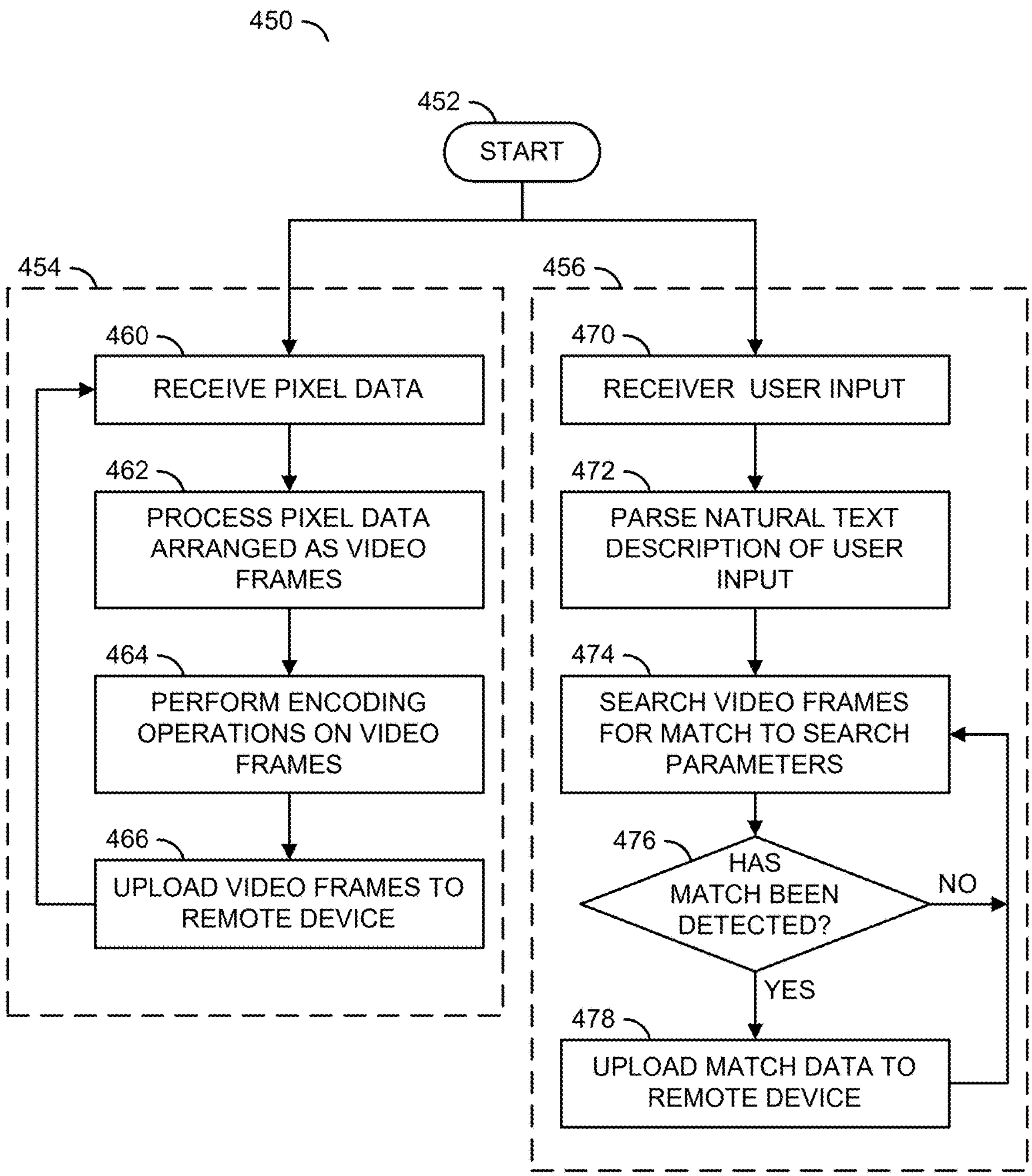
FIG. 9 is a flow diagram illustrating a method for classifying video frames for a match to a user prompt using a draft AI model.

Referring to FIG. 9, a method (or process) 450 is shown. The method 450 may classify video frames for a match to a user prompt using a draft AI model. The method 450 generally comprises step (or state) 452, a sub-process 454, a sub-process 456, a step (or state) 460, a step (or state) 462, a step (or state) 464, a step (or state) 466, a step (or state) 470, a step (or state) 472, a step (or state) 474, a decision step (or state) 476, and a step (or state) 478.

The step 452 may start the method 450. Next, the method 450 may move to the sub-process 454 and/or the sub-process 456. The sub-process 454 may comprise video encoding at an edge device (e.g., one of the camera systems 100*a*-100*n*). The sub-process 454 may comprise the steps 460-466. The sub-process 456 may comprise scene classification using a draft AI model at an edge device (e.g., one of the camera systems 100*a*-100*n*). The sub-process 456 may comprise the steps 470-478. The sub-process 454 and the sub-process 456 may be performed by the processor 102 in parallel and/or substantially in parallel.

The sub-process 454 may start at the step 460. In the step 460, the processor 102 may receive pixel data. For example, the image sensor 180 may generate the signal FRAMES comprising pixel data in response to the light input LIN captured by the capture device 104. Next, in the step 462, the encoding pipeline 252 may process the pixel data arranged as video frames. For example, the signal FRAMES may be received by the encoding pipeline 252 implemented by the processor 102. In the step 464, the encoding pipeline 252 may perform video encoding operations on the video frames. For example, the encoding pipeline 252 may perform encoding operations configured to encode the pixel data arranged as video frames into an H.264 format, an H.265 format, an AV1 format, etc. Next, in the step 466, the camera system 100 may upload the video frames to the remote device(s) 204*a*-204*n*. The encoding pipeline 252 may generate the signal EVID comprising the encoded video data. For example, the communication module 154 and/or the wireless interface 156 may communicate the signal EVID to the network 70, which may forward the encoded video frames to the remote computing devices 204*a*-204*n*. Next, the sub-process 454 may return to the step 460. For example, the sub-process 454 may continually capture video frames and generate encoded video frames.

The sub-process 456 may start at the step 470. In the step 470, the processor 102 may receive the user input. For example, the end-user may use one of the user devices 202*a*-202*n* to provide input (e.g., a user prompt). In one example, the camera system 100 may receive the signal SCHTXT at the communication module 154 and/or the wireless interface 156. Next, in the step 472, the AI module 254 may parse the natural text description of the user input. For example, the AI module 254 may implement the draft AI model 210 and the draft text encoder 422 may receive one of the prompts 436*a*-436*z* comprising the user input. The draft text encoder 422 may generate the search parameters. In the step 474, the AI module 254 may search the video frames for a match to the search parameters. For example, the draft vision encoder 420 implemented by the draft AI model 210 may be configured to generate the image-text pair data 410 to determine the identified image 412 based on the search parameters mapped in the shared latent space. Next, the sub-process 456 may move to the decision step 476.

In the decision step 476, the AI module 254 may determine whether a match has been detected. For example, the draft AI model 210 may search the image/text pair data 410 for an image that matches the text prompt of the user input in the signal SCHTXT. If no match has been detected, then the sub-process 456 may return to the step 474. If a match has been detected, then the sub-process 456 may move to the step 478. In the step 478, the camera system 100 may upload the match data to the remote devices 204*a*-204*n*. For example, the communication device 154 and/or the wireless interface 156 may communicate the signal MATCH generated by the draft AI model 210. Next, the sub-process 456 may return to the step 474.

Figure 10:
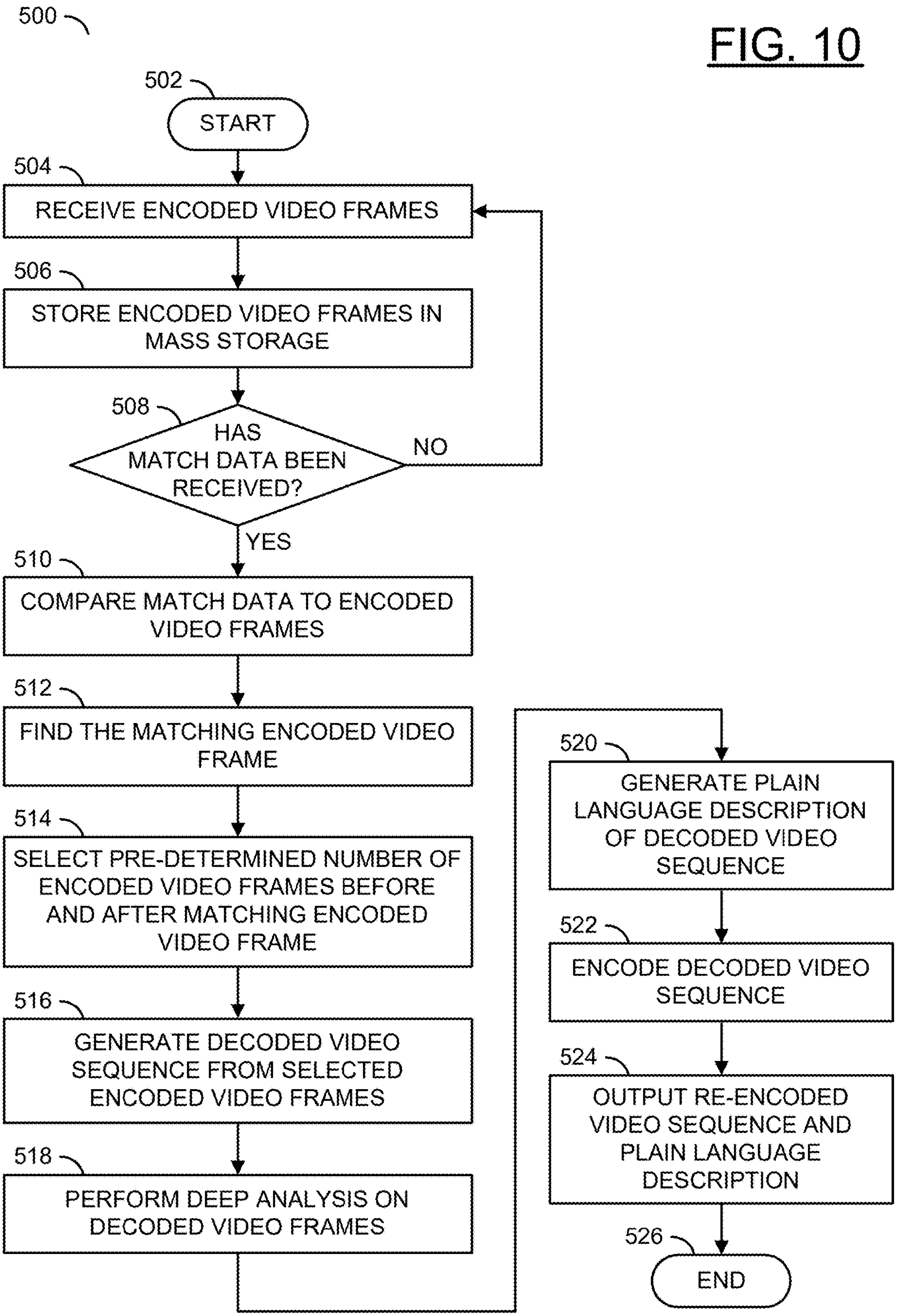
FIG. 10 is a flow diagram illustrating a method for generating a plain text description of a decoded video sequence in response to deep AI analysis by a full VLM.

Referring to FIG. 10, a method (or process) 500 is shown. The method 500 may generate a plain text description of a decoded video sequence in response to deep AI analysis by a full VLM. The method 500 generally comprises a step (or state) 502, a step (or state) 504, a step (or state) 506, a decision step (or state) 508, a step (or state) 510, a step (or state) 512, a step (or state) 514, a step (or state) 516, a step (or state) 518, a step (or state) 520, a step (or state) 522, a step (or state) 524, and a step (or state) 526.

The step 502 may start the method 500. In the step 504, the remote computing devices 204*a*-204*n* may receive the encoded video frames. For example, the remote computing devices 204*a*-204*n* may receive the signals EVID-A-EVID-N generated by the respective camera systems 100*a*-100*n* from the network 70. Next, in the step 506, the mass storage device 260 may store the encoded video frames. For example, the encoded video frames may comprise metadata that indicates which of the camera systems 100*a*-100*n* the video frames have been generated by (e.g., a camera ID value). Next, the method 500 may move to the decision step 508.

In the decision step 508, the remote computing devices 204*a*-204*n* may determine whether the match data has been received. For example, the network 70 may present the signal MATCH from one or more of the camera systems 100*a*-100*n*. If no match data has been received, then the method 500 may return to the step 504. For example, the remote computing devices 204*a*-204*n* may perform the deep AI analysis on demand in response the match data. If the match data has been received, then the method 500 may move to the step 510.

In the step 510, the CPU/GPU 262 may compare the match data to the encoded video frames stored in the mass storage 260. For example, the match data may be compared to the encoded video frames 310*a*-310*z* in the encoded video sequence 302. In an example, the CPU/GPU 262 may determine which of multiple encoded video streams stored in the mass storage 260 to search based on metadata of the encoded video sequence 302. For example, the match data may comprise a stream ID and/or a camera ID that may enable finding the corresponding encoded video stream for the match data. Next, in the step 512, the CPU/GPU 262 may find the matching encoded video frame 310*n*. For example, the match data may comprise a frame number and/or a timestamp that indicates the matching encoded video frame 310*n* for the match data. In the step 514, the CPU/GPU 262 may select a pre-determined number of the encoded video frames 310*a*-310*z* before and after the matching encoded video frame 310*n*. For example, a number of frames captured before and after the matching video frame to provide context for the scene may be selected from the encoded video sequence 302. Next, the method 500 may move to the step 516.

In the step 516, the CPU/GPU 262 may generate the decoded video sequence 306 from the selected encoded video frames 312. For example, the CPU/GPU 262 may perform video decoding operations on the selected encoded video frames 312 to generate the decoded video sequence 306. Next, in the step 518, the full VLM 212 may perform the deep AI analysis on the decoded video sequence 306. For example, the VLM vision encoder 426 may generate the image-conversational data 432*a*-432*n*. In the step 520, the full VLM 212 may generate the plain language description 308 based on the decoded video sequence 306. For example, the LLM 430 may generate human-readable text in response to the image-conversational data 432*a*-432*n*. Next, in the step 522, the CPU/GPU 262 may encode the decoded video sequence 306. For example, the encoding may be performed to stream the video sequence in a format playable by one of the user devices 202*a*-202*n*. For example, the match data may comprise video player capabilities of the user devices 202*a*-202*n* that sent the prompt (e.g., viewport size, resolution, frame rate, memory, etc.). In the step 524, the remote devices 204*a*-204*n* may output the re-encoded video sequence (e.g., the signal SVID) and/or the plain language description (e.g., the signal VDESC). Next, the method 500 may move to the step 526. The step 526 may end the method 500.

Figure 11:
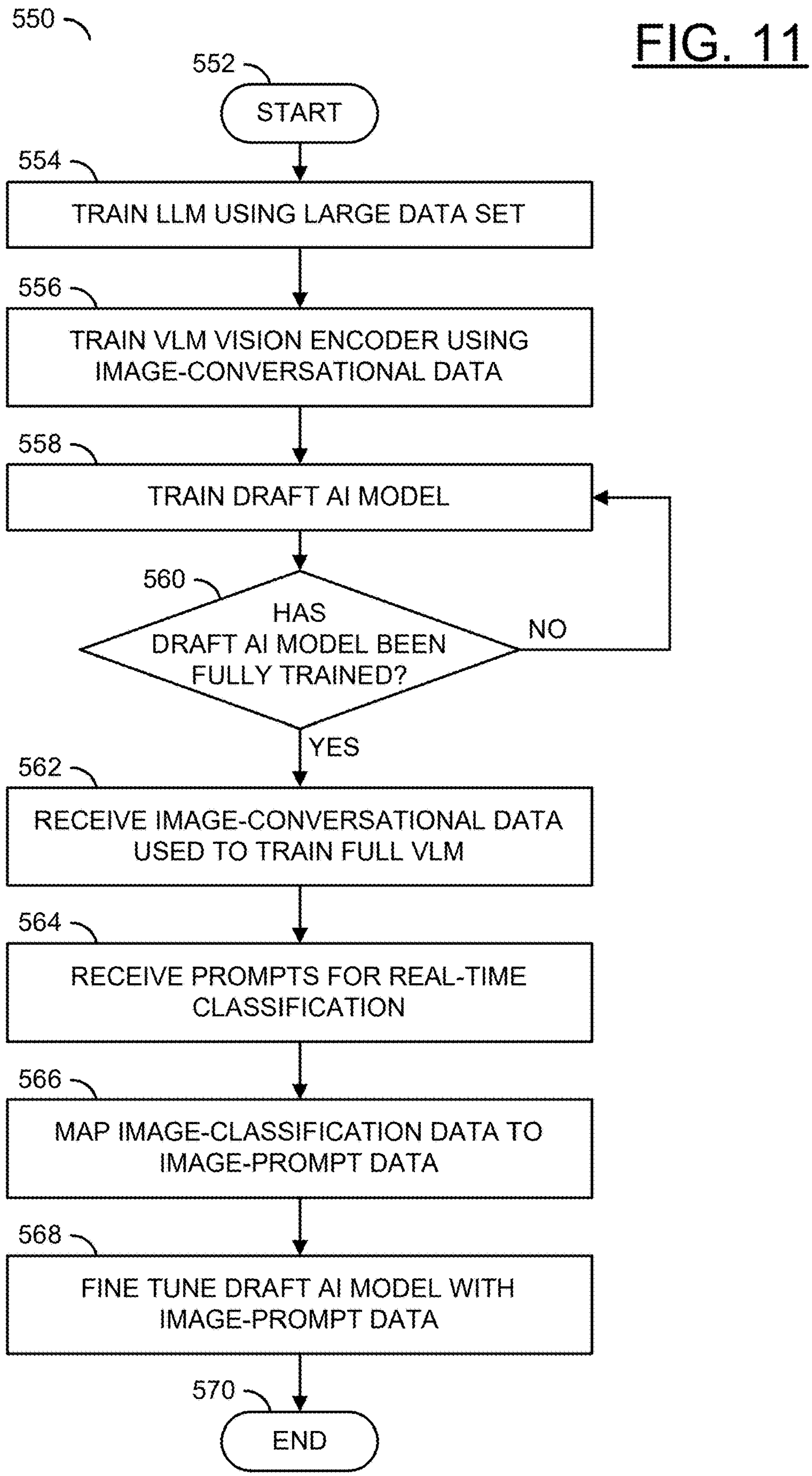
FIG. 11 is a flow diagram illustrating a method for jointly training a draft AI model by aligning training data with a full VLM.

Referring to FIG. 11, a method (or process) 550 is shown. The method 550 may jointly train a draft AI model by aligning training data with a full VLM. The method 550 generally comprises a step (or state) 552, a step (or state) 554, a step (or state) 556, a step (or state) 558, a decision step (or state) 560, a step (or state) 562, a step (or state) 564, a step (or state) 566, a step (or state) 568, and a step (or state) 570.

The step 552 may start the method 550. In the step 554, the LLM 430 of the full VLM 212 may be trained using a large data set. Next, in the step 556, the VLM vision encoder 426 may be trained using the image-conversational data 432*a*-432*n* provided by the LLM 430 in the signals IC1-ICN. In the step 558, the draft AI model 210 may be trained. For example, the draft AI model 210 may receive labeled image/text pair data and/or labeled text data for the draft vision encoder 420 and/or the draft text encoder 422. Next, the method 550 may move to the decision step 560.

In the decision step 560, the processor 102 may determine whether the draft AI model 210 has been fully trained. For example, a fully trained model may be capable of generating the image-text pair data 410 based on inputs that comprise visual data that has not explicitly been provided in the training data (e.g., without training data that was specific to the operating environment). If the draft AI model 210 has not been fully trained, then the method 550 may return to the step 558 to continue training. If the draft AI model 210 has been fully trained, then the method 550 may move to the step 562. In the step 562, the draft AI model 210 may receive the image-conversational data that was used to train the full VLM 212. Next, in the step 564, the draft AI model 210 may receive the prompts 436*a*-436*z* for real-time classifications. In the step 566, the image classification prompts 406 may map the image-classification data to the image-prompt data. For example, the full VLM 212 may perform the mapping. Next, in the step 468, the processor 102 may fine tune the draft AI model 210 with the image-prompt data. Next, the method 550 may move to the step 570. The step 570 may end the method 550.

Figure 12:
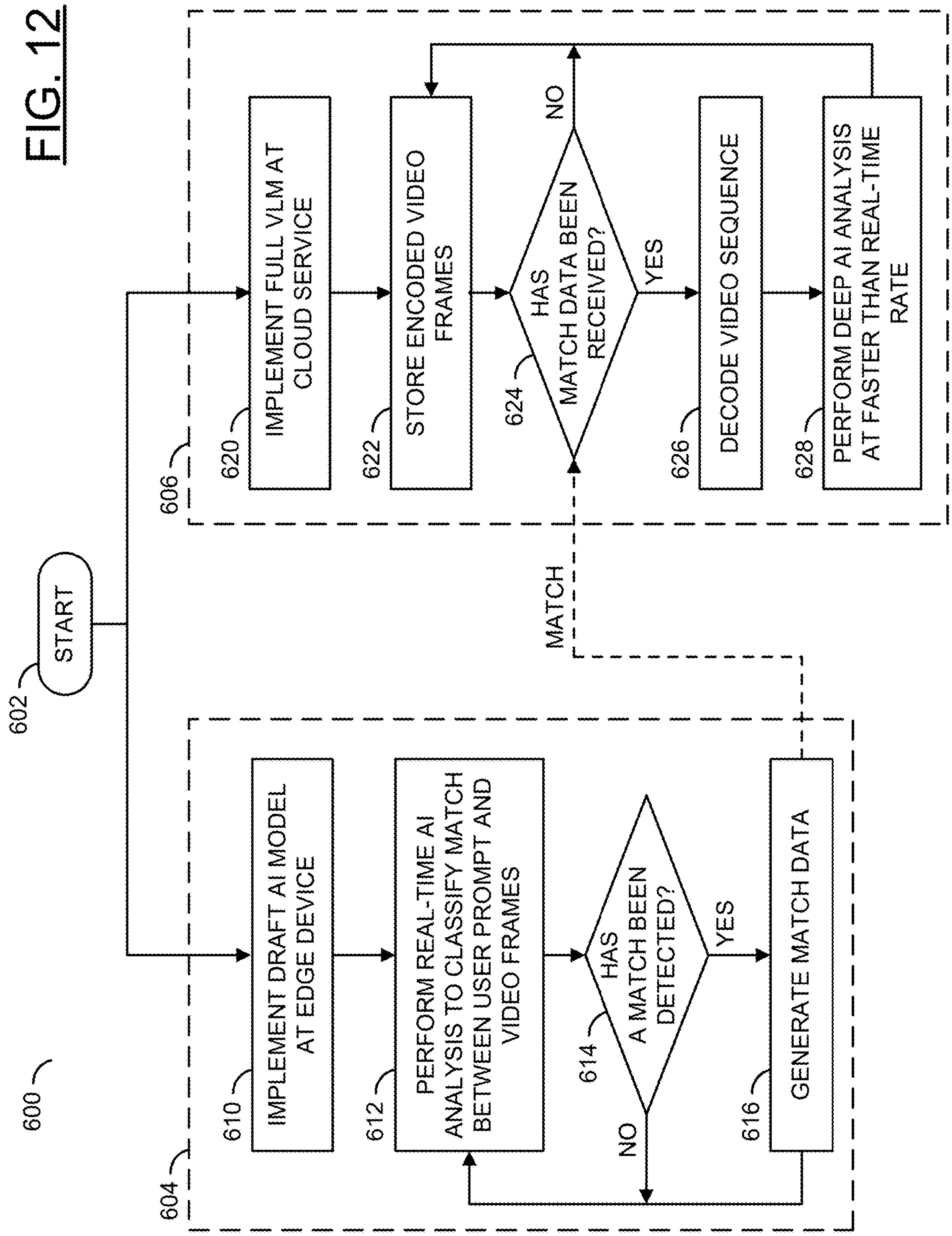
FIG. 12 is a flow diagram illustrating a method for implementing a two-stage camera-based video search using a combination of draft model and full vision language model.

Referring to FIG. 12, a method (or process) 600 is shown. The method 600 may implement a two-stage camera-based video search using a combination of draft model and full vision language model. The method 600 generally comprises a step (or state) 602, a sub-process 604, a sub-process 606, a step (or state) 610, a step (or state) 612, a decision step (or state) 614, a step (or state) 616, a step (or state) 620, a step (or state) 622, a decision step (or state) 624, a step (or state) 626, and a step (or state) 628.

The step 602 may start the method 600. Next, the method 600 may move to the sub-process 604 and/or the sub-process 606. The sub-process 604 may comprise performing the AI operations by the draft AI model 210 on an edge device (e.g., one of the camera systems 100*a*-100*n*). The sub-process 604 may comprise the steps 610-616. The sub-process 606 may comprise deep AI analysis by the full VLM 212 at the cloud service 204. The sub-process 606 may comprise the steps 620-628. The sub-process 604 and the sub-process 606 may be performed by the draft AI model 210 and the full VLM 212 in parallel and/or substantially in parallel.

The step 610 may start the sub-process 604. In the step 610, the processor 102 may implement the draft AI model 210 at the edge device 100. Next, in the step 612, the draft AI model 210 may perform the AI analysis in real-time to classify the match between the user prompt (e.g., the signal SCHTXT) and the video frames (e.g., the signal FRAMES). For example, the real-time analysis may enable the draft AI model 210 to search the video frames as the video frames are received (e.g., at the same rate as the frame rate). Next, the sub-process 604 may move to the decision step 614.

In the decision step 614, the draft AI model 210 may determine whether a match has been detected. For example, the draft AI model 210 may determine whether the identified frame 412 has been found based on the image/text pair data 410 generated. If no match has been detected, then the sub-process 604 may return to the step 612 to continue the real-time AI analysis. If the match has been detected, then the sub-process 604 may move to the step 616. In the step 616, the draft AI model 210 may generate the match data. For example, the camera system 100 may generate the signal MATCH comprising the frame number (or timestamp), a camera ID, the search parameters, etc. Next, the sub-process 604 may return to the step 612 to continue the real-time AI analysis (e.g., the draft AI model 210 may detect multiple instances of the user input query).

The step 620 may start the sub-process 606. In the step 620 the CPU/GPU 262 may implement the full VLM 212 in the cloud service 204. Next, in the step 622, the cloud service 204 may store the encoded video frames in the mass storage 260. Next, the sub-process 606 may move to the decision step 624.

In the decision step 624, the CPU/GPU 262 may determine whether the match data has been received. For example, the deep AI analysis may be performed on demand (e.g., the deep AI analysis may not be performed until initiated in order to conserve power). If the match data has not been received, then the sub-process 606 may return to the step 622. If the match data has been received, then the sub-process 606 may move to the step 626. In the step 626, the CPU/GPU 262 may generate the decoded video sequence 306 based on the match data. Next, in the step 628, the full VLM 212 may perform the deep AI analysis at rate faster than the real-time rate. For example, since the decoded video stream 306 is already generated, and the cloud service 204 comprises the CPU/GPU 262 with greater processing power than the processor 102 and the memory 264 with a greater capacity than the memory 150, the full VLM 212 may perform the deep AI analysis at a rate faster than the real-time framerate of the signal FRAMES. Next, the sub-process 606 may return to the step 622.

The functions performed by the diagrams of FIGS. 1-12 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. Execution of instructions contained in the computer product by the machine, may be executed on data stored on a storage medium and/or user input and/or in combination with a value generated using a random number generator implemented by the computer product. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:

an interface configured to receive (i) pixel data of an environment and (ii) a user input comprising a natural text description; and a processor configured to (i) process said pixel data arranged as raw video frames, (ii) perform encoding operations to generate encoded video frames in response to said raw video frames, (iii) implement a first AI module configured to operate on said raw video frames and (iv) upload to a remote computing device (A) image match data in response to said user input and said raw video frames and (B) said encoded video frames, wherein (a) said first AI module is configured to (i) parse said natural text description of said user input to determine search parameters, (ii) search said raw video frames for a match between said search parameters and video data of said raw video frames and (iii) enable said upload of said image match data in response to said match, (b) said remote computing device is configured to (i) store each of said encoded video frames, (ii) implement a second AI module and (iii) extract a decoded video sequence from only a portion of said encoded video frames identified in said image match data, (c) said second AI module implements a full AI model and said first AI module implements a draft model version of said full AI model, and (d) said second AI module is configured to generate a plain language description of said decoded video sequence in response to receiving said upload of said image match data.

2. The apparatus according to claim 1, wherein (i) said draft model version of said full AI model is a Contrastive Language-Image Pre-Training (CLIP) model and (ii) said full AI model is a Vision Language Model (VLM).

3. The apparatus according to claim 1, wherein (i) said processor is implemented as a system-on-chip (SoC) with a device memory, (ii) said remote computing device comprises a CPU, a GPU and a system memory and (iii) said CPU, said GPU and said system memory provide more Artificial Intelligence (AI) computation resources than said processor and said device memory.

4. The apparatus according to claim 1, wherein said image match data comprises a frame number corresponding to said match between said search parameters and video data of said raw video frames.

5. The apparatus according to claim 1, wherein said apparatus comprises a security camera.

6. The apparatus according to claim 1, wherein said remote computing device is an AI server located on-premise with said apparatus.

7. The apparatus according to claim 1, wherein said remote computing device is implemented using a cloud computing network.

8. The apparatus according to claim 1, wherein said natural text description of said user input and said plain language description enable a video question answer configuration for searching said raw video frames.

9. The apparatus according to claim 1, wherein said draft model version of said full AI model is a zero shot model configured to enable a prompt of said draft model version of said full AI model to be tuned to said environment without training specific to said environment.

10. The apparatus according to claim 1, wherein (A) said remote computing device is configured to (i) extract said decoded video sequence from said encoded video frames and (ii) present said decoded video sequence to said second AI module, each in response to receiving said image match data and (B) limiting an input to said second AI module to said decoded video sequence when said image match data is received prevents said second AI module from continuously consuming power to perform AI operations.

11. The apparatus according to claim 1, wherein said decoded video sequence comprises a first number of said encoded video frames before a frame number of said image match data and a second number of said encoded video frames after said frame number of said image match data.

12. The apparatus according to claim 1, wherein said plain language description of said decoded video sequence is generated by said second AI module in response to performing AI operations to determine time-based and behavioral information of video data in said decoded video sequence.

13. The apparatus according to claim 1, wherein providing said decoded video sequence to said second AI module enables said full AI model to perform AI operations at a faster rate than a frame rate of said raw video frames.

14. The apparatus according to claim 1, wherein providing said decoded video sequence to said second AI module enables said full AI model to perform AI operations on demand.

15. The apparatus according to claim 1, wherein said draft model version of said full AI model and said full AI model are jointly trained.

16. The apparatus according to claim 1, wherein said draft model version of said full AI model is trained based on contrastive learning by computing a similarity between text and image pairs.

17. The apparatus according to claim 1, wherein said processor is configured to perform said encoding operations to generate said encoded video frames in response to said raw video frames in parallel with said first AI module performing said search of said raw video frames for said match between said search parameters and said video data of said raw video frames in real time.

18. A system comprising:

a plurality of capture devices each configured to (i) capture pixel data, (ii) process said pixel data arranged as raw video frames, (iii) generate encoded video frames in response to encoding operations performed on said raw video frames, (iv) implement a first AI module configured to operate on said raw video frames, and (v) determine image match data in response to a user input and said raw video frames; and a remote computing device configured to (i) store each of said encoded video frames uploaded from said plurality of capture devices, (ii) implement a second AI module and (iii) generate a decoded video sequence from only a portion of said encoded video frames in said image match data from one of said plurality of capture devices, wherein (a) said first AI module is configured to (i) parse a natural text description of said user input to determine search parameters, (ii) search said raw video frames for a match between said search parameters and video data of said raw video frames and (iii) enable an upload of said image match data in response to said match, (b) said second AI module implements a full AI model and said first AI module implements a draft model version of said full AI model, and (c) said second AI module is configured to generate a plain language description of said decoded video sequence in response to receiving said upload of said image match data.

19. The system according to claim 18, wherein (i) said user input is provided to a companion app by a user inputting said natural text description and (ii) said plain language description is presented as an output to said companion app.

20. The system according to claim 19, wherein said companion app is implemented on a smartphone.

* * * * *